(12) United States Patent
Hu et al.

(10) Patent No.: US 11,025,467 B2
(45) Date of Patent: Jun. 1, 2021

(54) DATA SENDING METHOD AND APPARATUS

(71) Applicant: HUAWEI TECHNOLOGIES CO., LTD., Shenzhen (CN)

(72) Inventors: Yuanzhou Hu, Shanghai (CN); Mengying Ding, Shanghai (CN); Shuri Liao, Shanghai (CN); Fan Wang, Berkshire (GB); Lei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/914,643

(22) Filed: Jun. 29, 2020

(65) Prior Publication Data

US 2020/0328926 A1   Oct. 15, 2020

Related U.S. Application Data

(63) Continuation of application No. PCT/CN2018/125593, filed on Dec. 29, 2018.

(30) Foreign Application Priority Data

Dec. 30, 2017   (CN) .......................... 201711485466.5

(51) Int. Cl.
*H04L 27/26*   (2006.01)

(52) U.S. Cl.
CPC ...... *H04L 27/2614* (2013.01); *H04L 27/2671* (2013.01); *H04L 27/2672* (2013.01)

(58) Field of Classification Search
CPC . H04L 27/2636; H04L 27/2614; H04L 27/26; H04L 27/2628; H04L 27/2607;
(Continued)

(56) References Cited

U.S. PATENT DOCUMENTS

| 8,320,434 B2 | 11/2012 | Kim et al. |
| 8,995,420 B2 | 3/2015 | Meng et al. |

(Continued)

FOREIGN PATENT DOCUMENTS

| CN | 101321147 A | 12/2008 |
| CN | 101682448 A | 3/2010 |

(Continued)

OTHER PUBLICATIONS

Qualcomm Incorporated,"Discussion on SRS Design", 3GPP TSG RAN WG1 #88bis R1-1705595,Apr. 3-7, 2017, total 11 pages.
(Continued)

*Primary Examiner* — Rahel Guarino
(74) *Attorney, Agent, or Firm* — Hauptman Ham, LLP

(57) ABSTRACT

A data sending apparatus includes a processor and a transceiver. The processor is configured to generate K first frequency-domain data streams, wherein a $k^{th}$ first frequency-domain data stream of the K first frequency-domain data streams is determined by performing preprocessing on a $k^{th}$ first modulated data stream, and the preprocessing includes at least a Fourier transform, a cyclic extension, or a phase rotation. The processor is further configured to map the K first frequency-domain data streams to frequency-domain resources to generate a time-domain symbol, and the transceiver is configured to send the time-domain symbol. A length of the $k^{th}$ first frequency-domain data stream of the K first frequency-domain data streams is $N_k$, and a length of the $k^{th}$ first modulated data stream is $M_k$. K is a positive integer greater than 1, $N_k$ and $M_k$ are positive integers, and k is an integer k=0, 1, ..., K−1.

20 Claims, 20 Drawing Sheets

(58) Field of Classification Search
CPC ............. H04L 27/2601; H04L 27/2634; H04L 27/2671; H04L 27/2672
See application file for complete search history.

(56) References Cited

U.S. PATENT DOCUMENTS

| | | | |
|---|---|---|---|
| 2007/0004465 | A1 | 1/2007 | Papasakellariou et al. |
| 2009/0225822 | A1 | 9/2009 | Tupala et al. |
| 2011/0149944 | A1* | 6/2011 | Ko ..................... H04L 27/2614 370/344 |
| 2017/0134204 | A1 | 5/2017 | Yun et al. |

FOREIGN PATENT DOCUMENTS

| | | |
|---|---|---|
| CN | 101888361 A | 11/2010 |
| CN | 102916923 A | 2/2013 |
| CN | 104639281 A | 5/2015 |
| CN | 105743835 A | 7/2016 |
| CN | 107135057 A | 9/2017 |
| EP | 3445012 A1 | 2/2019 |
| WO | 2010062230 A1 | 6/2010 |
| WO | 2017193867 A1 | 11/2017 |

OTHER PUBLICATIONS

International Search Report issued in corresponding International Application No. PCT/CN2018/125593, dated Feb. 27, 2019, pp. 1-9, National Intellectual Property Administration, Beijing, China.
Chinese Office Action issued in corresponding Chinese Application No. 201711485466.5, dated Jan. 3, 2020, pp. 1-9, State Intellectual Property Office of People's Republic of China, Beijing, China.
European Search Report issued in corresponding European Application No. 18895062.0, dated Dec. 17, 2020, pp. 1-7, European Patent Office, Munich, Germany.

* cited by examiner

DATA SENDING METHOD AND APPARATUS

CROSS-REFERENCE TO RELATED APPLICATIONS

This application is a continuation of International Patent Application No. PCT/CN2018/125593, filed on Dec. 29, 2018, which claims priority to Chinese Patent Application No. 201711485466.5, filed on Dec. 30, 2017, The disclosures of the aforementioned applications are hereby incorporated by reference in their entireties.

TECHNICAL FIELD

This application relates to the field of communications technologies, and in particular, to a data sending method and apparatus.

BACKGROUND

In a Long Term Evolution (long term evolution, LTE for short) system, Fourier transform is performed on modulated data to generate frequency-domain data, the frequency-domain data is consecutively mapped to a frequency-domain resource, and then inverse Fourier transform is performed on the frequency-domain data to generate time-domain data, so that uplink single-carrier (single carrier, also referred to as DFT-spreading-OFDM) data is obtained. Single-carrier data has a lower peak to average power ratio (peak to average power ratio, PAPR for short) than orthogonal frequency division multiplexing (orthogonal frequency division multiplexing, OFDM for short) data. In other words, when passing through a power amplifier, the single-carrier data is affected by less attenuation and distortion than the OFDM data. Therefore, the single-carrier data may be sent by using higher power, thereby providing better coverage performance.

To obtain a frequency domain diversity gain, in the LTE system, an uplink single carrier may divide single-carrier frequency-domain data into two parts for the discrete mapping, so that the PAPR of the single-carrier data is increased. The PAPR of the single-carrier data may also be increased when the manner is applied to new radio (new radio, NR for short) system. Therefore, coverage is reduced.

SUMMARY

Embodiments of this application provide a data sending method and apparatus, to maintain a PAPR of single-carrier data and increase coverage.

To achieve the foregoing objective, the following technical solutions are provided in the embodiments of this application.

According to a first aspect, a data sending method is provided. The data sending method includes: generating K first frequency-domain data streams, where a $k^{th}$ first frequency-domain data stream is obtained by performing preprocessing on a $k^{th}$ first modulated data stream, and the preprocessing includes at least Fourier transform, cyclic extension, and phase rotation; a length of the $k^{th}$ first frequency-domain data stream is $N_k$, and a length of the $k^{th}$ first modulated data stream is $M_k$; K is a positive integer greater than 1; k=0, 1, . . . , K−1; and $N_k$ and $M_k$ are positive integers; mapping the K first frequency-domain data streams to frequency-domain resources, to generate a time-domain symbol; and sending the time-domain symbol. According to the method provided in the first aspect, a data stream of which a length is $N_k$ is obtained by performing the Fourier transform and the cyclic extension in the preprocessing on the $k^{th}$ first modulated data stream of which a length is $M_k$. A time-domain waveform corresponding to the data stream of which the length is $N_k$ is approximate to a comb shape. To be specific, a part having a relatively low amplitude and a part having a relatively high amplitude alternately appear in the time-domain waveform. The phase rotation in the preprocessing can stagger parts having high amplitudes in the time-domain waveforms corresponding to the foregoing different data streams, to avoid in-phase superposition of the parts having high amplitudes in the time-domain waveforms corresponding to the K data streams. Therefore, when the K data streams are discretely mapped in frequency domain, a PAPR of converted time-domain data can be prevented from increasing. Usually, an increase in a PAPR of the data indicates an increase in a CM of the data. Therefore, according to the method provided in this embodiment of this application, when the K data streams are discretely mapped in frequency domain, a CM of the converted time-domain data can be further prevented from increasing.

In a possible design, the length $M_k$ of the $k^{th}$ first modulated data stream is determined by $N_k$ and K.

In a possible design, $M_k = N_k/K$. In the possible implementation, according to the method provided in the first aspect, performance of preventing the PAPR of the converted time-domain data from increasing may be enabled to be better.

In a possible design, a phase factor used for the phase rotation corresponding to the $k^{th}$ first frequency-domain data stream includes $e^{j\alpha_k n}$, where n=0, 1, . . . , $N_k$−1, and $\alpha_k$ is a phase parameter related to k.

In a possible design, $e^{j\alpha_k n}$ is $$e^{\frac{-j2\pi k n}{N_k}}, e^{\frac{j2\pi n k}{N_k}}, e^{\frac{-j2\pi n(N_k - k)}{N_k}}, \text{ or } e^{\frac{j2\pi n(N_k - k)}{N_k}}.$$

In a possible design, at least two of the K first modulated data streams are two parts of a second modulated data stream.

According to a second aspect, a data sending method is provided. The data sending method includes: generating K first frequency-domain data streams, where a $k^{th}$ first frequency-domain data stream is obtained by performing preprocessing on a $k^{th}$ first modulated data stream, and the preprocessing includes at least a zero padding operation and Fourier transform; a length of the $k^{th}$ first frequency-domain data stream is $N_k$, and a length of the $k^{th}$ first modulated data stream is $M_k$; K is a positive integer greater than 1; k=0, 1, . . . , K−1; and $N_k$ and $M_k$ are positive integers; mapping the K first frequency-domain data streams to frequency-domain resources, to generate a time-domain symbol; and sending the time-domain symbol. According to the method provided in the second aspect, the zero padding operation and the Fourier transform are performed on a first modulated data stream, to obtain a first frequency-domain data stream; and resource mapping is performed on the first frequency-domain data stream, and then the first frequency-domain data stream is converted into the time-domain symbol through inverse Fourier transform. Because positions of data of different first modulated data streams in K first modulated data streams in corresponding zero padded data streams are not overlapped, there is a low probability that peaks of time-domain symbols of different data streams obtained through the inverse Fourier transform after the resource mapping is performed on different first frequency-domain data streams are overlapped, that is, there is a low probability that peaks are superposed in a same direction, thereby decreasing a PAPR of the time-domain symbols converted from the K first frequency-domain data streams, so that the PAPR is close to a PAPR of single-carrier data.

In a possible design, in the zero padding operation corresponding to the $k^{th}$ first frequency-domain data stream, positions of data of the $k^{th}$ first modulated data stream in a data stream obtained through the zero padding operation are consecutively arranged; or positions of data of the $k^{th}$ first modulated data stream in a data stream obtained through the zero padding operation are arranged in a comb form.

In a possible design, the preprocessing further includes filtering processing performed after the Fourier transform is performed. In the possible implementation, according to the method provided in the second aspect, a PAPR of converted time-domain data can better be prevented from increasing.

In a possible design, starting positions and/or end positions of data of K first modulated data streams in corresponding data streams obtained through the zero padding operation are the same, and the preprocessing further includes phase rotation performed after the Fourier transform is performed. In the possible implementation, the zero padding operation, the Fourier transform, and the phase rotation are performed on a first modulated data stream, to obtain a first frequency-domain data stream; and resource mapping is performed on the first frequency-domain data stream, and then the first frequency-domain data stream is converted into the time-domain symbol through the inverse Fourier transform. Because positions of data of different first modulated data streams in the K first modulated data streams in corresponding zero padded data streams are overlapped, there is a relatively high probability that peaks of time-domain symbols of different data streams obtained through the inverse Fourier transform after the resource mapping is performed on different first frequency-domain data streams are overlapped, that is, there is a relatively high probability that peaks are superposed in a same direction. By performing different phase rotation on frequency-domain data of different data streams, different cyclic shift may be performed on the time-domain symbols of different data streams, so that the peaks of the time-domain symbols of different data streams are shifted to different positions, thereby greatly reducing the probability of peak overlapping. Therefore, a PAPR of the time-domain symbols converted from the K first frequency-domain data streams is decreased, so that the PAPR is close to a PAPR of single-carrier data.

In a possible design, a phase factor used for the phase rotation corresponding to the $k^{th}$ first frequency-domain data stream includes $e^{j\theta_k n}$, where n=0, 1, . . . , $N_k$−1, and $\theta_k$ is a phase parameter related to k.

In a possible design, when the positions of the data of the $k^{th}$ first modulated data stream in the data stream obtained through the zero padding operation are consecutive, $e^{j\theta_k n}$ is $$e^{\frac{-j2\pi k n}{K}}, e^{\frac{j2\pi k n}{K}}, e^{\frac{-j2\pi(K-k)n}{K}}, \text{ or } e^{\frac{j2\pi(K-k)n}{K}}.$$

In a possible design, when the positions of the data of the $k^{th}$ first modulated data stream in the data stream obtained through the zero padding operation are arranged in a comb form, $e^{j\theta_k n}$ is $$e^{\frac{-j2\pi k n}{N_k}}, e^{\frac{j2\pi n k}{N_k}}, e^{\frac{-j2\pi n(N_k-k)}{N_k}}, \text{ or } e^{\frac{j2\pi n(N_k-k)}{N_k}}.$$

In a possible design, the $k^{th}$ first modulated data stream is obtained by performing Pi/2-BPSK modulation on to-be-sent data.

According to a third aspect, a data receiving method is provided. The data receiving method includes: receiving a time-domain symbol; converting the time-domain symbol into a frequency-domain signal, and then performing resource demapping on the frequency-domain signal, to obtain K first frequency-domain data streams, where K is a positive integer greater than 1; and determining K first modulated data streams based on the K first frequency-domain data streams, where a $k^{th}$ first modulated data stream is obtained by performing equalization and restoration processing on a $k^{th}$ first frequency-domain data stream, the restoration processing includes: phase rotation, combination, and inverse Fourier transform; a length of the $k^{th}$ first frequency-domain data stream is $N_k$, and a length of the $k^{th}$ first modulated data stream is $M_k$; k=0, 1, . . . , K−1; and $N_k$ and $M_k$ are positive integers. According to the method provided in the third aspect, at a transmit end, a zero padding operation and Fourier transform are performed on a first modulated data stream, to obtain a first frequency-domain data stream; and resource mapping is performed on the first frequency-domain data stream, and then the first frequency-domain data stream is converted into the time-domain symbol through inverse Fourier transform. Because positions of data of different first modulated data streams in the K first modulated data streams in corresponding zero padded data streams are not overlapped, there is a low probability that peaks of time-domain symbols of different data streams obtained through the inverse Fourier transform after the resource mapping is performed on different first frequency-domain data streams are overlapped, that is, there is a low probability that peaks are superposed in a same direction, thereby decreasing a PAPR of the time-domain symbols converted from the K first frequency-domain data streams, so that the PAPR is close to a PAPR of single-carrier data. It can be learned that the PAPR of the time-domain symbol received by a receive end is close to the PAPR of the single-carrier data.

In a possible design, the length $M_k$ of the $k^{th}$ first modulated data stream is determined by $N_k$ and K.

In a possible design, $M_k = N_k/K$. In the possible implementation, according to the method provided in the third aspect, performance of preventing a PAPR of converted time-domain data from increasing may be enabled to be better.

In a possible design, a phase factor used for the phase rotation corresponding to the $k^{th}$ first frequency-domain data stream includes $e^{-j\alpha_k n}$, where n=0, 1, . . . , $N_k$−1, and $\alpha_k$ is a phase parameter related to k.

In a possible design, $e^{-j\alpha_k n}$ is $$e^{\frac{j2\pi n k}{N_k}}, e^{\frac{-j2\pi k n}{N_k}}, e^{\frac{j2\pi n(N_k-k)}{N_k}}, \text{ or } e^{\frac{-j2\pi n(N_k-k)}{N_k}}.$$

According to a fourth aspect, a data receiving method is provided. The data receiving method includes: receiving a time-domain symbol; converting the time-domain symbol into a frequency-domain signal, and then performing resource demapping on the frequency-domain signal, to obtain K first frequency-domain data streams, where K is a positive integer greater than 1; and determining K first modulated data streams based on the K first frequency-domain data streams, where a $k^{th}$ first modulated data stream is obtained by performing equalization and restoration processing on a $k^{th}$ first frequency-domain data stream, the restoration processing includes inverse Fourier transform and an extraction operation, and k=0, 1, . . . , K−1. According to the method provided in the fourth aspect, at a transmit end, a zero padding operation and Fourier transform are performed on a first modulated data stream, to obtain a first frequency-domain data stream; and resource mapping is performed on the first frequency-domain data stream, and then the first frequency-domain data stream is converted into the time-domain symbol through the inverse Fourier transform. Because positions of data of different first modulated data streams in the K first modulated data streams in corresponding zero padded data streams are not overlapped, there is a low probability that peaks of time-domain symbols of different data streams obtained through the inverse Fourier transform after the resource mapping is performed on different first frequency-domain data streams are overlapped, that is, there is a low probability that peaks are superposed in a same direction, thereby decreasing a PAPR of the time-domain symbols converted from the K first frequency-domain data streams, so that the PAPR is close to a PAPR of single-carrier data. It can be learned that the PAPR of the time-domain symbol received by a receive end is close to the PAPR of the single-carrier data.

In a possible design, in an extraction operation corresponding to the $k^{th}$ first frequency-domain data stream, positions of data of the $k^{th}$ first modulated data stream in a to-be-extracted data stream are consecutively arranged; or positions of data of the $k^{th}$ first modulated data stream in a to-be-extracted data stream are arranged in a comb form.

In a possible design, the restoration processing further includes filtering processing performed before the Fourier transform is performed. In the possible implementation, according to the method provided in the fourth aspect, a PAPR of converted time-domain data can better be prevented from increasing.

In a possible design, starting positions and/or end positions of data of the K first modulated data streams in corresponding to-be-extracted data streams are the same, and the restoration processing further includes phase rotation performed before the inverse Fourier transform is performed. In the possible implementation, a zero padding operation, Fourier transform, and the phase rotation are performed on a first modulated data stream, to obtain a first frequency-domain data stream; and the resource mapping is performed on the first frequency-domain data stream, and then the first frequency-domain data stream is converted into the time-domain symbol through the inverse Fourier transform. Because positions of data of different first modulated data streams in the K first modulated data streams in the corresponding zero padded data streams are overlapped, there is a relatively high probability that peaks of time-domain symbols of different data streams obtained through the inverse Fourier transform after the resource mapping is performed on different first frequency-domain data streams are overlapped, that is, there is a relatively high probability that peaks are superposed in a same direction. By performing different phase rotation on frequency-domain data of different data streams, different cyclic shift may be performed on the time-domain symbols of different data streams, so that the peaks of the time-domain symbols of different data streams are shifted to different positions, thereby greatly reducing the probability of peak overlapping. Therefore, a PAPR of the time-domain symbols converted from the K first frequency-domain data streams is decreased, so that the PAPR is close to a PAPR of single-carrier data.

In a possible design, a phase factor used for the phase rotation corresponding to the $k^{th}$ first frequency-domain data stream includes $e^{-j\theta_k n}$, where n=0, 1, . . . , $N_k$−1, and $\theta_k$ is a phase parameter related to k.

In a possible design, when the positions of the data of the $k^{th}$ first modulated data stream in the to-be-extracted data stream are consecutive, $e^{-j\theta_k n}$ is $$e^{\frac{j2\pi kn}{K}}, e^{\frac{-j2\pi kn}{K}}, e^{\frac{j2\pi(K-k)n}{K}}, \text{ or } e^{\frac{-j2\pi(K-k)n}{K}}.$$

In a possible design, when the positions of the data of the $k^{th}$ first modulated data stream in the to-be-extracted data stream are arranged in a comb form, $e^{-j\theta_k n}$ is $$e^{\frac{j2\pi nk}{N_k}}, e^{\frac{-j2\pi kn}{N_k}}, e^{\frac{j2\pi n(N_k-k)}{N_k}}, \text{ or } e^{\frac{-j2\pi n(N_k-k)}{N_k}}.$$

According to a fifth aspect, a communications apparatus is provided. The apparatus may be the foregoing transmit end (Which may also be referred to as a data sending apparatus) or the foregoing receive end (which may also be referred to as a data receiving apparatus). When the apparatus is the transmit end, the apparatus has a function of implementing any method according to the first aspect or the second aspect. When the apparatus is the receive end, the apparatus has a function of implementing any method according to the third aspect or the fourth aspect. The functions may be implemented by using hardware, or may be implemented by hardware executing corresponding software. The hardware or software includes one or more units corresponding to the foregoing functions. The apparatus may exist in a product form of a chip.

According to a sixth aspect, a communications apparatus is provided. The communications apparatus includes a memory and a processor. The memory is configured to store a computer executable instruction, and the processor executes the computer executable instruction stored in the memory. The apparatus may be the foregoing transmit end (which may also be referred to as a data sending apparatus) or the foregoing receive end (which may also be referred to as a data receiving apparatus). When the apparatus is the transmit end, the computer executable instruction executed by the processor is used to enable the apparatus to implement any method according to the first aspect or the second aspect. When the apparatus is the receive end, the computer executable instruction executed by the processor is used to enable the apparatus to implement any method according to the third aspect or the fourth aspect. The apparatus may exist in a product form of a chip.

According to a seventh aspect, a computer-readable storage medium is provided. The computer-readable storage medium includes an instruction. When the instruction is run on a computer, the computer is enabled to perform any method according to the first aspect, the second aspect, the third aspect, or the fourth aspect.

According to an eighth aspect, a computer program product including an instruction is provided. When the computer program product is run on a computer, the computer is enabled to perform any method according to the first aspect, the second aspect, the third aspect, or the fourth aspect.

For beneficial effects of any implementation of any one of the fifth aspect to the eighth aspect, refer to beneficial effects of the corresponding implementation of the first aspect to the fourth aspect. Details are not described herein again.

DESCRIPTION OF EMBODIMENTS

The following describes technical solutions in embodiments of this application with reference to accompanying drawings in the embodiments of this application. In descriptions of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of this application, "a plurality of" means two or more than two.

A method provided in the embodiments of this application may be applied to a wireless communications system, such as an LTE system and an evolved system thereof, a long term evolution-advanced (long term evolution-advanced, LTE-A for short) system and an evolution system thereof, an NR system, and a 5G wireless communications system.

Figure 1A:
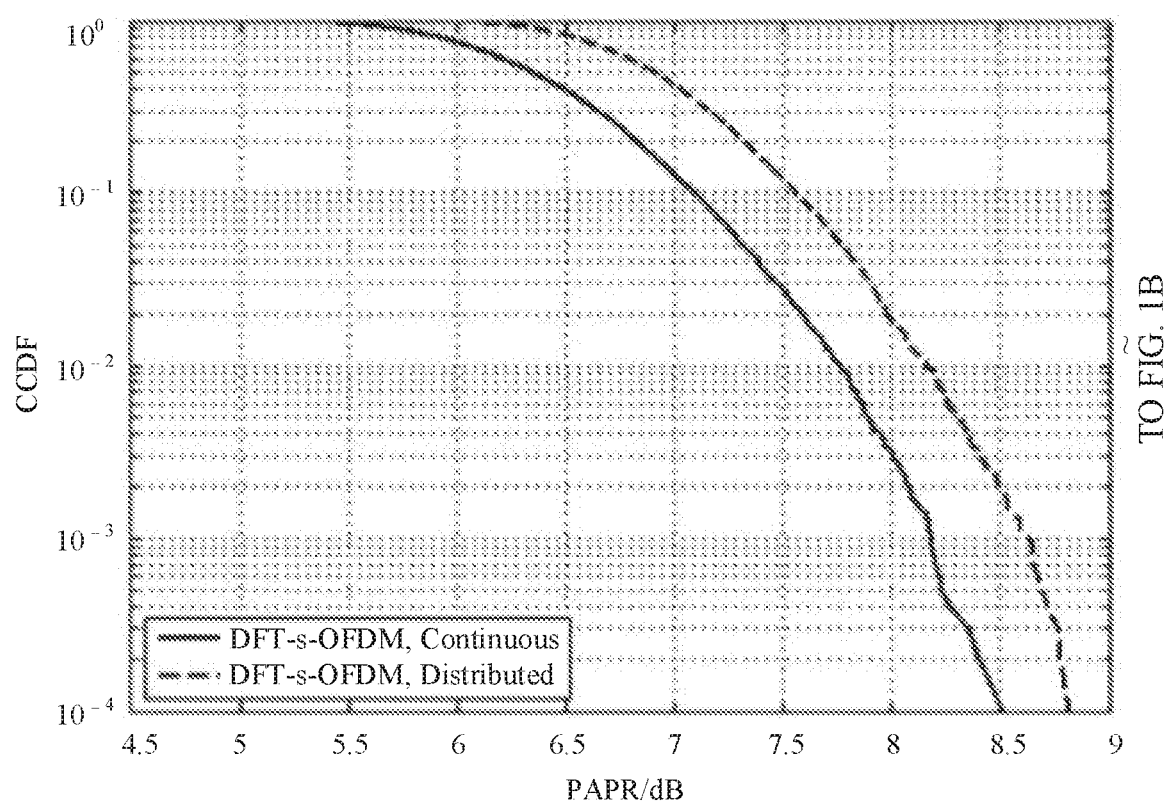
FIG. 1A and FIG. 1B are schematic diagrams of PAPR performance and CM performance according to an embodiment of this application.
Figure 1B:
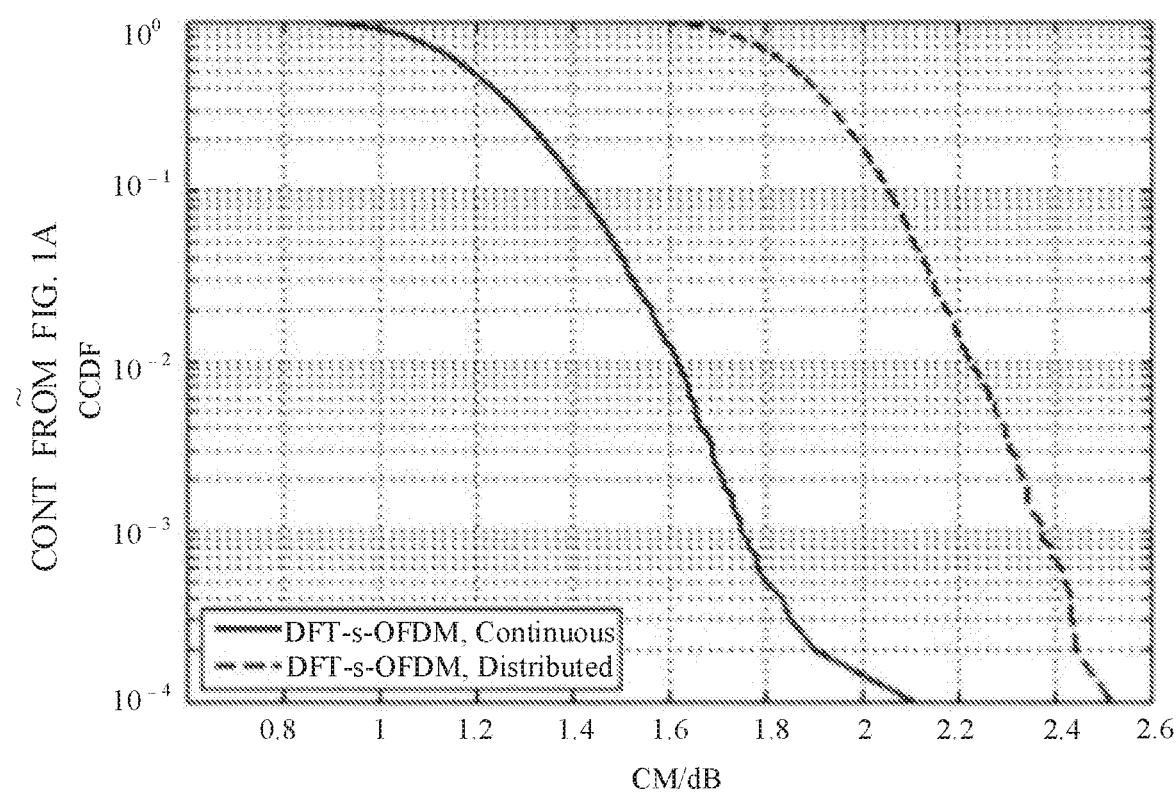

In NR, Pi/2-BPSK (binary phase shift keying) modulation is introduced to single-carrier modulation, and approximately 2.2 dB of PAPR performance is obtained in a manner in which filtering is performed by a filter that does not extend bandwidth. Compared with an uplink single carrier, this further improves edge coverage. To obtain a frequency domain diversity gain, in an LTE system, the uplink single carrier may divide frequency-domain data that is obtained after Fourier transform is performed on modulated data in a single-carrier waveform into two pieces for discrete mapping. To be specific, each piece of data is consecutively mapped, and positions to which the two pieces of data are mapped are not overlapped and are discrete. As compared with conventional consecutive mapping, a PAPR and a cubic metric (cubic metric, CM for short) of single-carrier data are slightly improved in this manner. In uplink single-carrier quadrature phase shift keying (quadrature phase shift keying, QPSK for short) modulation, PAPR performance (left in FIG. 1A and FIG. 1B) and CM performance (right in FIG. 1A and FIG. 1B) of a conventional consecutive mapping manner and PAPR performance (left in FIG. 1A and FIG. 1B) and CM performance (right in FIG. 1A and FIG. 1B) of a discrete mapping manner in which single-carrier frequency-domain data is divided into two pieces are shown in FIG. 1A and FIG. 1B. A black solid line represents the performance of the consecutive mapping manner, and a black dashed line represents the performance of the discrete mapping manner in which single-carrier frequency-domain data is divided into two pieces. It can be found that the PAPR performance and the CM performance are both slightly improved after the single-carrier frequency-domain data is divided into two pieces for discrete mapping.

Figure 2A:
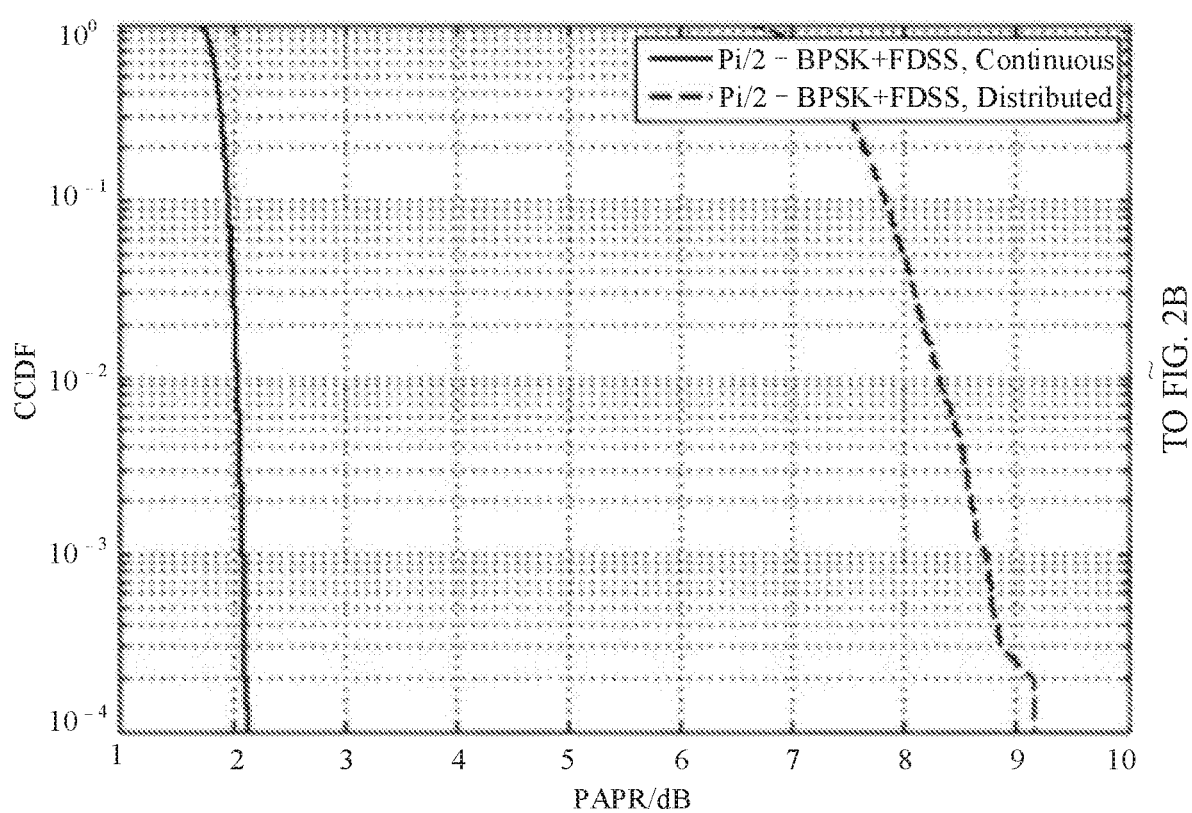
FIG. 2A and FIG. 2B are other schematic diagrams of PAPR performance and CM performance according to an embodiment of this application.
Figure 2B:
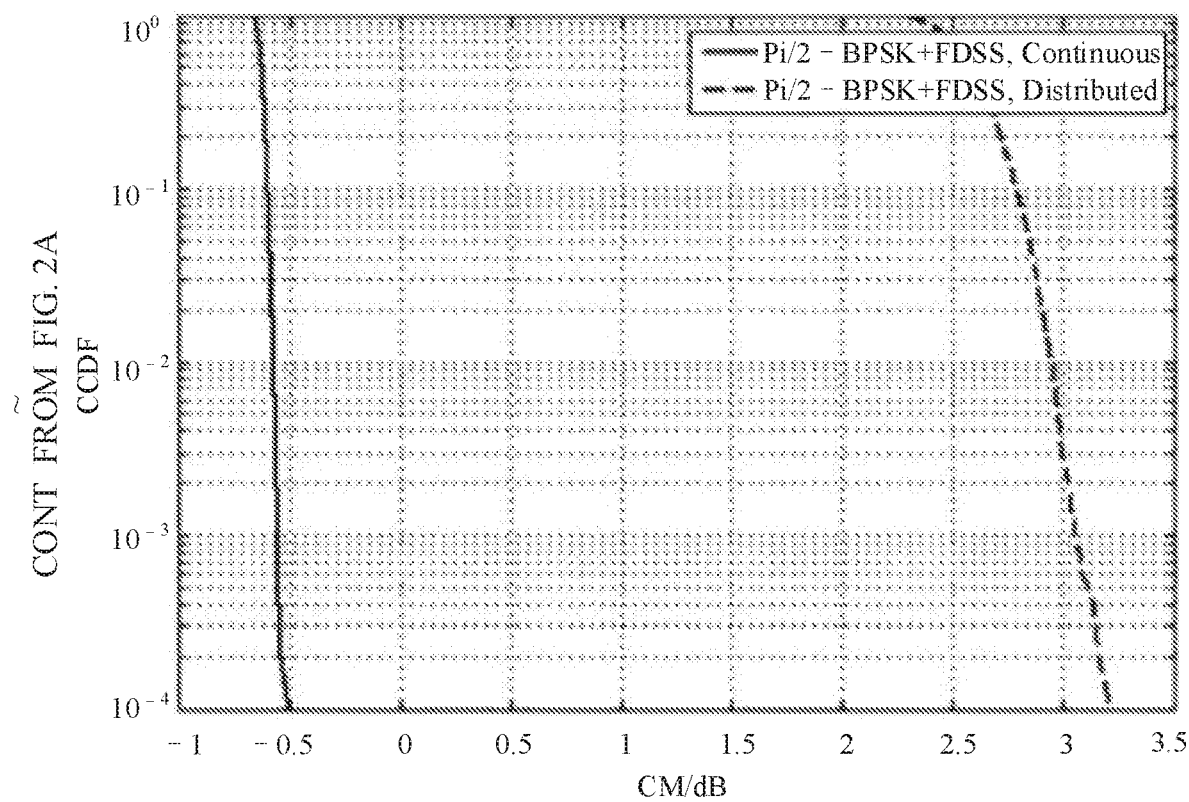

The manner in which filtering is performed by a filter that does not extend bandwidth is used in the single-carrier Pi/2-BPSK modulation introduced to the NR. If the method applied to the LTE is used to divide filtered frequency-domain data into two pieces for discrete mapping, the PAPR and the CM are greatly improved, and coverage is significantly reduced. When the manner in which filtering is performed by a filter that does not extend bandwidth is used in the single-carrier Pi/2-BPSK modulation, PAPR performance (left in FIG. 2A and FIG. 2B) and CM performance (right in FIG. 2A and FIG. 2B) of a conventional consecutive mapping manner and PAPR performance (left in FIG. 2A and FIG. 2B) and CM performance (right in FIG. 2A and FIG. 2B) of a discrete mapping manner in which filtered frequency-domain data is divided into two pieces are shown in FIG. 2A and FIG. 2B. A black solid line represents the performance of the consecutive mapping manner, and a black dashed line represents the performance of the discrete mapping manner in which filtered frequency-domain data is divided into two pieces. It can be found that, when the manner in which filtering is performed by a filter that does not extend bandwidth is used in the single-carrier Pi/2-BPSK modulation, the PAPR and the CM are greatly improved after the filtered frequency-domain data is divided into two pieces for discrete mapping, and even exceed the PAPR and the CM of the single-carrier data obtained through the conventional QPSK modulation. Therefore, coverage performance is severely affected.

Figure 3:
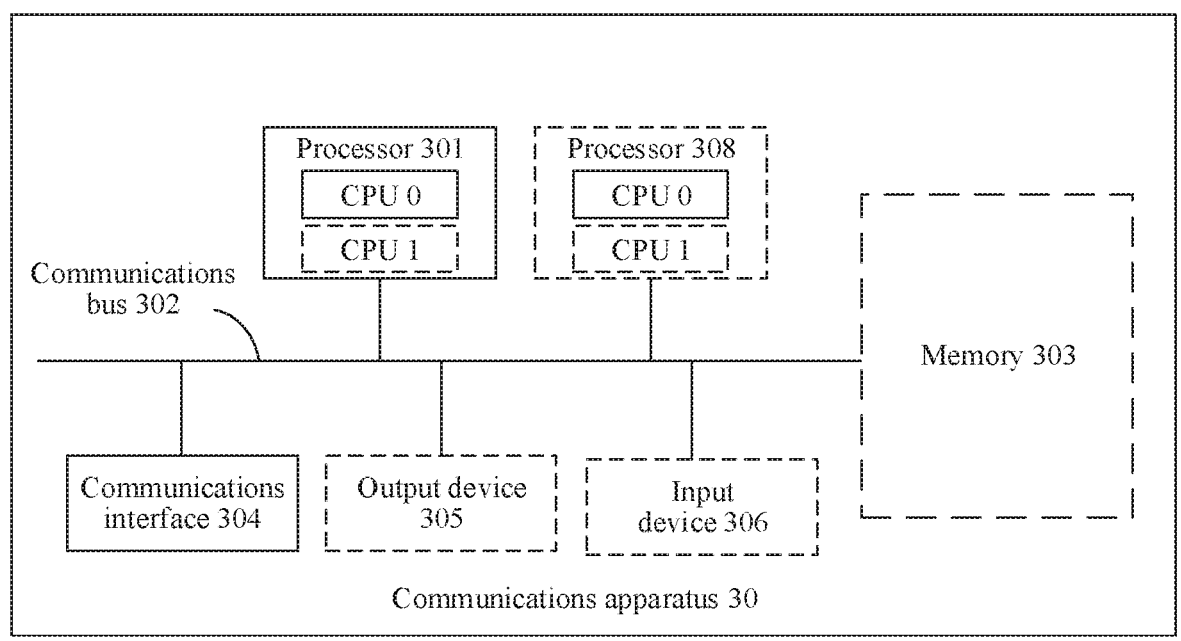
FIG. 3 is a schematic diagram of a hardware structure of a communications apparatus according to an embodiment of this application.

FIG. 3 is a schematic diagram of a hardware structure of a communications apparatus 30 according to an embodiment of this application. The communications apparatus 30 includes at least one processor 301, a communications bus 302, and at least one communications interface 304. Optionally, the communications apparatus 30 may further include a memory 303. In an embodiment, the communications apparatus 30 may be a communications device, or may be a chip. Specifically, the communications apparatus 30 may be a transmit end or a receive end in the following description.

The processor 301 may be a general-purpose central processing unit (central processing unit, CPU for short), a microprocessor, an application-specific integrated circuit (application-specific integrated circuit, ASIC for short), or one or more integrated circuits configured to control program execution of the solution of this application.

The communications bus 302 may include a path used to transmit information between the foregoing components.

The communications interface 304 is configured to communicate with another component, or communicate another device or communications network such as the Ethernet, a radio access network (radio access network, RAN for short), or a wireless local area network (wireless local area networks, WLAN for short). In an embodiment, the communications interface may be any apparatus such as a transceiver, and is configured to communicate with another device. For example, the communications interface may be a transceiver in the communications device.

The memory 303 may be a read-only memory (read-only memory, ROM for short) or another type of static storage device that can store static information and a static instruction, or a random access memory (random access memory, RAM for short) or another type of dynamic storage device that can store information and an instruction, or may be an electrically erasable programmable read-only memory (electrically erasable programmable read-only memory, EEPROM for short), a compact disc read-only memory (compact disc read-only memory, CD-ROM for short) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store desired program code in a form of an instruction or a data structure and that can be accessible to a computer, but is not limited thereto. The memory may independently exist and be connected to the processor by using the bus. The memory may alternatively be integrated in the processor.

The memory 303 is configured to store application program code used to perform the solution of this application, and execution of the application program code is controlled by the processor 301. The processor 301 is configured to execute the application program code stored in the memory 303, thereby implementing a method according to the embodiments of this application in the following description.

During specific implementation, in an embodiment, the processor 301 may include one or more CPUs, for example, a CPU 0 and a CPU 1 shown in FIG. 3.

During specific implementation, in an embodiment, the communications apparatus 30 may include a plurality of processors, for example, a processor 301 and a processor 308 in FIG. 3. Each of the processors may be a single-core (single-CPU) processor, or may be a multi-core (multi-CPU) processor. The processor herein may refer to one or more devices, circuits, and/or processing cores configured to process data (such as a computer program instruction).

During specific implementation, in an embodiment, the communications apparatus 30 may further include an output device 305 and an input device 306.

An embodiment of this application provides a data sending and receiving method. A transmit end may send data by using step 401 to step 403 in the method shown in FIG. 4, and a receive end may receive data by using step 404 to step 406 in the method shown in FIG. 4.

Figure 4:
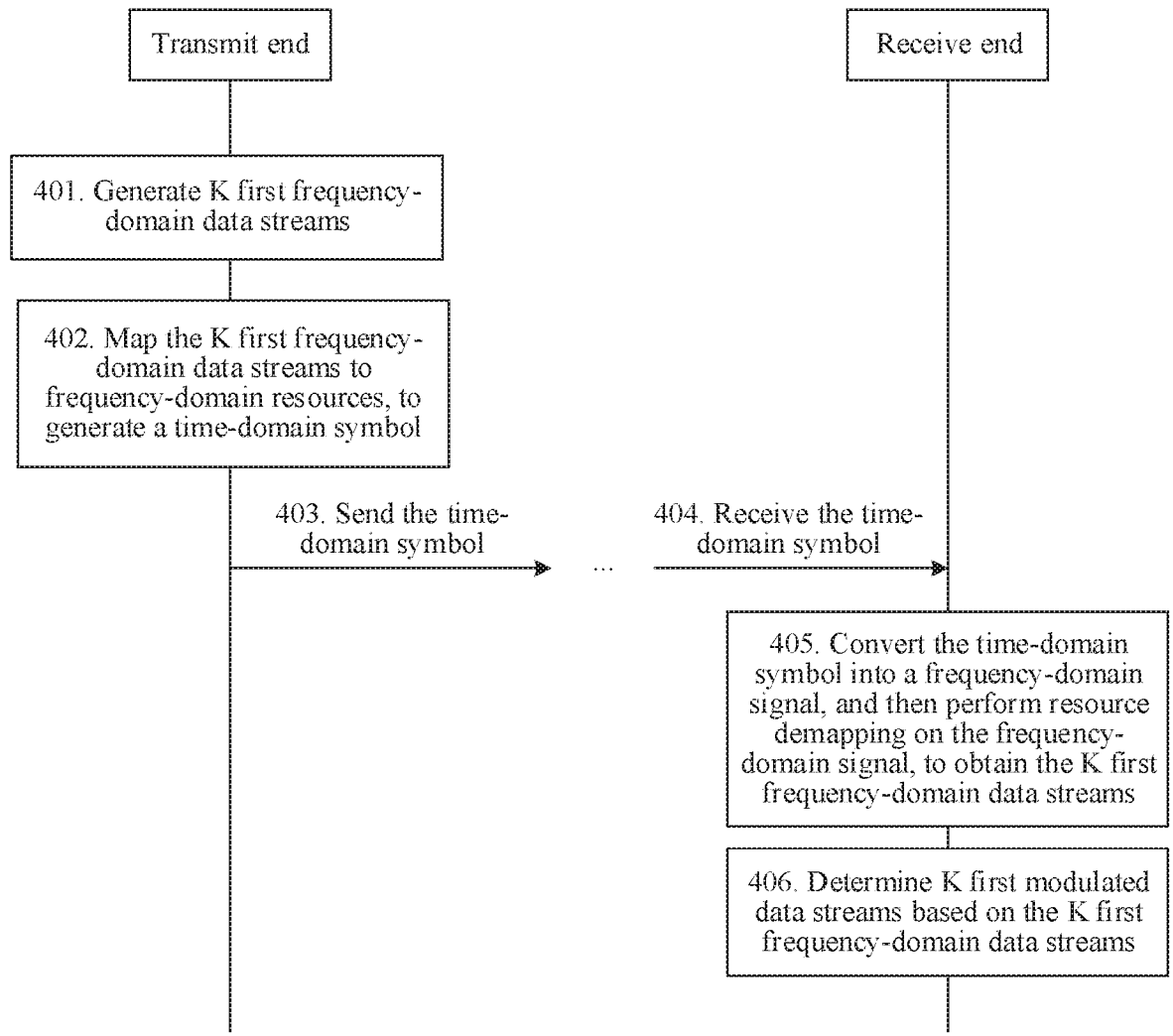
FIG. 4 is an interaction flowchart of a data sending and receiving method according to an embodiment of this application.

As shown in FIG. 4, the method includes the following steps.

401. The transmit end generates K first frequency-domain data streams, where a $k^{th}$ first frequency-domain data stream is obtained by performing preprocessing on a $k^{th}$ first modulated data stream, and the preprocessing includes at least Fourier transform, cyclic extension, and phase rotation; a length of the $k^{th}$ first frequency-domain data stream is $N_k$, and a length of the $k^{th}$ first modulated data stream is $M_k$; K is a positive integer greater than 1; k=0, 1, . . . , K−1; and $N_k$ and $M_k$ are positive integers.

The transmit end may be a communications device. For example, the transmit end may be a terminal or a base station. A first modulated data stream may be a sequence including complex data. In this embodiment of this application, a length of a data stream is a quantity of elements included in the data stream. When the data stream is the sequence including the complex data, the element may be one piece of the complex data.

$N_k$ is greater than $M_k$. Different first frequency-domain data streams may have a same length or different lengths, and different first modulated data streams may have a same length or different lengths.

The transmit end may determine a value of $M_k$ in the following manner 1 or manner 2.

Manner 1. The value of $M_k$ is determined by using signaling.

In this case, the transmit end may be a terminal, and the receive end may be a base station. The terminal receives first signaling sent by the base station. The first signaling includes the value of $M_k$. The terminal determines the value of $M_k$ based on the first signaling.

For example, the first signaling may be specifically radio resource control (radio resource control, RRC for short) signaling, a media access control control element (media access control control elements, MAC CE for short), a downlink control information (downlink control information, DCI for short), or the like.

Manner 2 The value of $M_k$ is obtained through calculation.

Optionally, the length $M_k$ of the $k^{th}$ first modulated data stream is determined by $N_k$ and K.

In this case, the transmit end may determine the value of $M_k$ based on $M_k=\gamma_k N_k$, where $\gamma_k$ is greater than 0 and less than 1.

In a possible implementation, $\gamma_k=1/K$, that is, $M_k=N_k/K$. In another possible implementation, the transmit end obtains $\gamma_k$ by using the signaling, or $\gamma_k$ is a value predefined by a system. For example, $\gamma_k$ may be ½, ⅓, ¼, ⅕, ⅙, ⅐, ⅛, or the like.

Modulated data in the $k^{th}$ first modulated data stream may be data obtained through BPSK modulation, Pi/2-BPSK modulation, QPSK modulation, Pi/4-QPSK modulation, 16 quadrature amplitude modulation (quadrature amplitude modulation, QAM for short), 64QAM, 128QAM, 256QAM, or the like.

A size of the Fourier transform corresponding to the $k^{th}$ first modulated data stream is $M_k$. The Fourier transform in this embodiment of this application may be discrete Fourier transform (discrete fourier transform, DFT for short) or fast Fourier transform (fast fourier transform, FFT for short). For example, if an $m^{th}$ element in the $k^{th}$ first modulated data stream is $d^k(m)$, where $m=0, 1, 2, \ldots, M_k-1$, and a $p^{th}$ element in a data stream obtained through the Fourier transform is $A^k(p)$, where $$p = 0, 1, 2, \ldots, M_k - 1,$$

$$A^k(p) = \frac{1}{\sqrt{M_k}} \sum_{m=0}^{M_k-1} d^k(m) e^{-\frac{j2\pi pm}{M_k}}.$$

Optionally, the preprocessing may be specifically the Fourier transform, the cyclic extension, and the phase rotation that are performed sequentially.

The cyclic extension may specifically include performing the cyclic extension on the data stream of which a length is $M_k$, to obtain a data stream of which a length is $N_k$. For example, if the cyclic extension operation is performed after the Fourier transform is performed, the $p^{th}$ element in the data stream obtained through the Fourier transform is $A^k(p)$, where $p=0, 1, 2, \ldots, M_k-1$, and an $n^{th}$ element in a data stream obtained through the cyclic extension is $B^k(n)$, where $n=0, 1, 2, \ldots, N_k-1$, $B^k(n)=A^k(n \bmod M_k)$, where "mod" represents "performing a modulo operation".

When $M_k=N_k/K$, it is easy to learn that the data stream $B^k$ is obtained by repeating $A^k$ for K times.

The phase rotation may specifically include multiplying each element in the data stream by a phase, where the phases by which the elements are multiplied may be the same or different. Optionally, a phase factor used for the phase rotation corresponding to the $k^{th}$ data stream includes $e^{j\alpha_k n}$, where $n=0, 1, \ldots, N_k-1$. For example, the phase rotation is performed after the cyclic extension is performed. A phase factor used for the phase rotation corresponding to the $n^{th}$ element in the data stream obtained through the cyclic extension corresponding to the $k^{th}$ data stream is $e^{j\alpha_k n}$, that is, phase factors by which the $N_k$ elements in the data stream $B^k(n)$ obtained through the cyclic extension are multiplied are related to positions of the elements in the data stream. For example, $\alpha_k$ is related to a number k of the data stream, and is related to $N_k$.

Optionally, $e^{j\alpha_k n}$ is $$e^{-\frac{j2\pi kn}{N_k}}, e^{\frac{j2\pi kn}{N_k}}, e^{-\frac{j2\pi n(N_k-k)}{N_k}}, \text{ or } e^{-\frac{j2\pi n(N_k-k)}{N_k}}.$$

For example, if the phase rotation operation is performed after the cyclic extension is performed, and the $n^{th}$ element in the data stream obtained through the phase rotation is $C^k(n)$, where $n=0, 1, 2, \ldots, N_k-1$, $C^k(n)=B^k(n) e^{j\alpha_k n}$.

The foregoing preprocessing (including the Fourier transform, the cyclic extension, and the phase rotation) process may be implemented by using an expression. For example, if the $m^{th}$ element in the $k^{th}$ first modulated data stream is $d^k(m)$, where $m=0, 1, 2, \ldots, M_k-1$, the $n^{th}$ element in the $k^{th}$ first frequency-domain data stream is $D^k(n)$, where $n=0, 1, 2, \ldots, N_k-1$, and the $k^{th}$ first frequency-domain data stream is obtained by sequentially performing the Fourier transform, the cyclic extension, and the phase rotation on the $k^{th}$ first modulated data stream, a possible description manner is $$D^k(n) = \frac{1}{\sqrt{M_k}} \sum_{m=0}^{M_k-1} d^k(m) e^{-j\frac{2\pi(n \bmod M_k)m}{M_k}} e^{j\alpha_k n}.$$

In this case, it is easy to learn that $D^k(n)=C^k(n)$.

Optionally, the K first modulated data streams may be obtained by using a second modulated data stream. Specifically, the $k^{th}$ first modulated data stream is a part of the second modulated data stream, that is, the second modulated data stream includes the K first modulated data streams.

In a possible description manner, the second modulated data stream is $d=\{d^0, d^1, \ldots, d^K\}$ and corresponds to an SC-FDMA symbol, where $d^k$ is the $k^{th}$ first modulated data stream including $M_k$ complex symbols (or complex data) and is denoted as $d^k=\{d^k(0), d^k(1), \ldots, d^k(M_k-1)\}$, where $k=0, 1, \ldots, K-1$; and an m' element in the second modulated data stream is $d(m')$, where $m'=0, 1, 2, \ldots, \Sigma_{i=0}^{K-1} M_i -1$. Optionally, lengths of the K first modulated data streams are all equal to M. In this case, $d^k(m)=d(m+kM)$, where $m=0, 1, \ldots, M-1$.

Figure 4A:
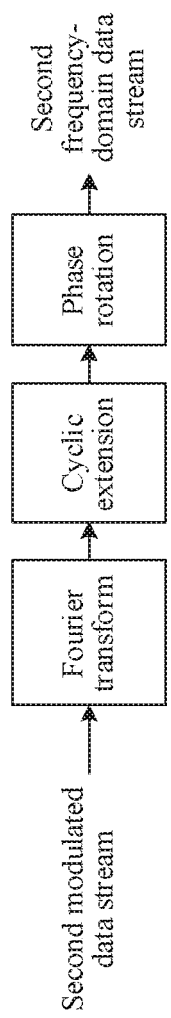
FIG. 4A is a flowchart of processing data according to an embodiment of this application.

Referring to FIG. 4A, a second frequency-domain data stream is obtained by performing preprocessing (including the Fourier transform, the cyclic extension, and the phase rotation) on the second modulated data stream.

The second frequency-domain data stream is $D=\{D^0, D^1, \ldots, D^K\}$, where $D^k$ is the $k^{th}$ first frequency-domain data stream including $N_k$ complex symbols (or complex data) and is denoted as $D^k=\{D^k(0), D^k(1), \ldots, D^k(M_k-1)\}$, where $k=0, 1, \ldots, K-1$. Optionally, lengths of the K first modulated data streams are all equal to N. Optionally, $N=M \cdot K$. Specifically, the $k^{th}$ first frequency-domain data stream $D^k$ is obtained by performing preprocessing (including the Fourier transform, the cyclic extension, and the phase rotation) on the $k^{th}$ first modulated data stream $d^k$, where $k=0, 1, \ldots, K-1$.

A correspondence between the second modulated data stream d and the second frequency-domain data stream D is:

$$D(k \cdot N + n) = \frac{1}{\sqrt{M}} \sum_{m=0}^{M-1} d(k \cdot M + m) e^{-j\frac{2\pi m(n \bmod M)}{M}} e^{-j\frac{2\pi kn}{N}},$$

where $k=0, 1, \ldots, K-1$, and
$n=0, 1, \ldots, N-1$.

The second frequency-domain data stream includes $M_{SC}^{PUSCH}=N \cdot K$ complex symbols, where $M_{SC}^{PUSCH}$ is a size of a scheduled transmit bandwidth and is in a unit of a subcarrier. $M_{SC}^{PUSCH}=M_{RB}^{PUSCH} \cdot N_{SC}^{RB}$, where $M_{RB}^{PUSCH}$ is a size of a scheduled transmit bandwidth and is in a unit of an RB (resource block), and $N_{SC}^{RB}$ is a quantity of subcarriers included in one RB and is usually 12. It is easily learned that a size of the Fourier transform corresponding to the $k^{th}$ second modulated data stream is $M=M_{RB}^{PUSCH}/K^2 \cdot N_{SC}^{RB}$, and complexity of a fast Fourier transform algorithm is low when M meets the following condition: $M=2^{\psi_2} \cdot 3^{\psi_3} \cdot 5^{\psi_5}$, where $\psi_2$, $\psi_3$, and $\psi_5$ are nonnegative integers. Therefore, to ensure relatively low implementation complexity of a transmitting apparatus and a receiving apparatus, because a value of $N_{SC}^{RB}$ is 12, a value of $M_{RB}^{PUSCH}$ needs to meet the following condition: $M_{RB}^{PUSCH}=K^2 \cdot 2^{\phi_2} \cdot 3^{\phi_3} \cdot 5^{\phi_5}$, where $\phi_2$, $\phi_3$, and $\phi_5$ are nonnegative integers.

402. The transmit end maps the K first frequency-domain data streams to frequency-domain resources, to generate a time-domain symbol.

During specific implementation of step 402, the $k^{th}$ first frequency-domain data stream may be mapped to a $k^{th}$ frequency-domain resource, to obtain a $k^{th}$ third frequency-domain data stream. The $k^{th}$ frequency-domain resource may include consecutive resources, where a resource length of the $k^{th}$ frequency-domain resource is $N_k$, a resource starting position of the $k^{th}$ frequency-domain resource is $S_k$, and a resource end position of the $k^{th}$ frequency-domain resource is $E_k$. The frequency-domain resources corresponding to different first frequency-domain data streams are not overlapped.

Specifically, the transmit end may determine $N_k$ by using signaling. In this case, the transmit end may be a terminal, and the receive end may be a base station. The terminal receives second signaling from the base station. The second signaling includes information about at least one of the starting position, the end position, and the resource length of the $k^{th}$ frequency-domain resource. The terminal determines a value of $N_k$ based on the second signaling. For example, the second signaling may be specifically RRC signaling, a MAC CE, UCI, DCI, or the like.

The time-domain symbol is obtained by performing inverse Fourier transform on K third frequency-domain data streams. The inverse Fourier transform in this embodiment of this application may be inverse discrete Fourier transform (inverse discrete fourier transform, IDFT for short) or inverse fast Fourier transform (inverse fast fourier transform, IFFT for short).

Figure 5:
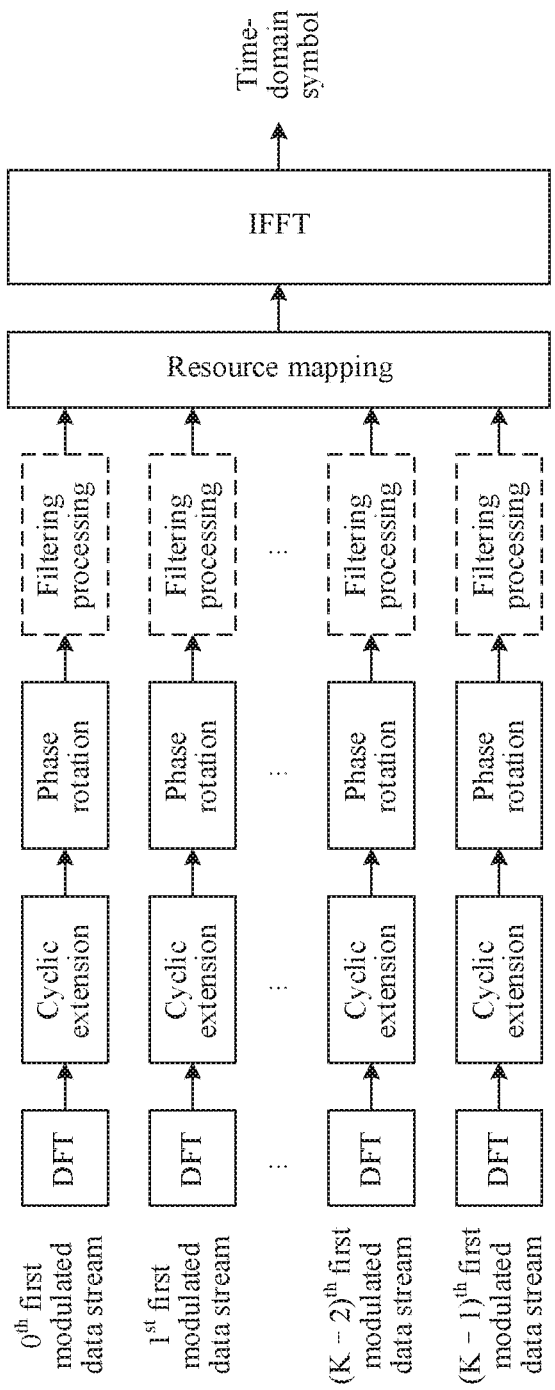
FIG. 5 is a flowchart of a data sending method according to an embodiment of this application.

During specific implementation of step 402, for a possible implementation, refer to FIG. 5. The transmit end may perform resource mapping on the K first frequency-domain data streams, to obtain the K third frequency-domain data streams, where a frequency-domain signal includes the K third frequency-domain data streams, and perform the inverse Fourier transform on the frequency-domain signal, to obtain the time-domain symbol.

Figure 6:
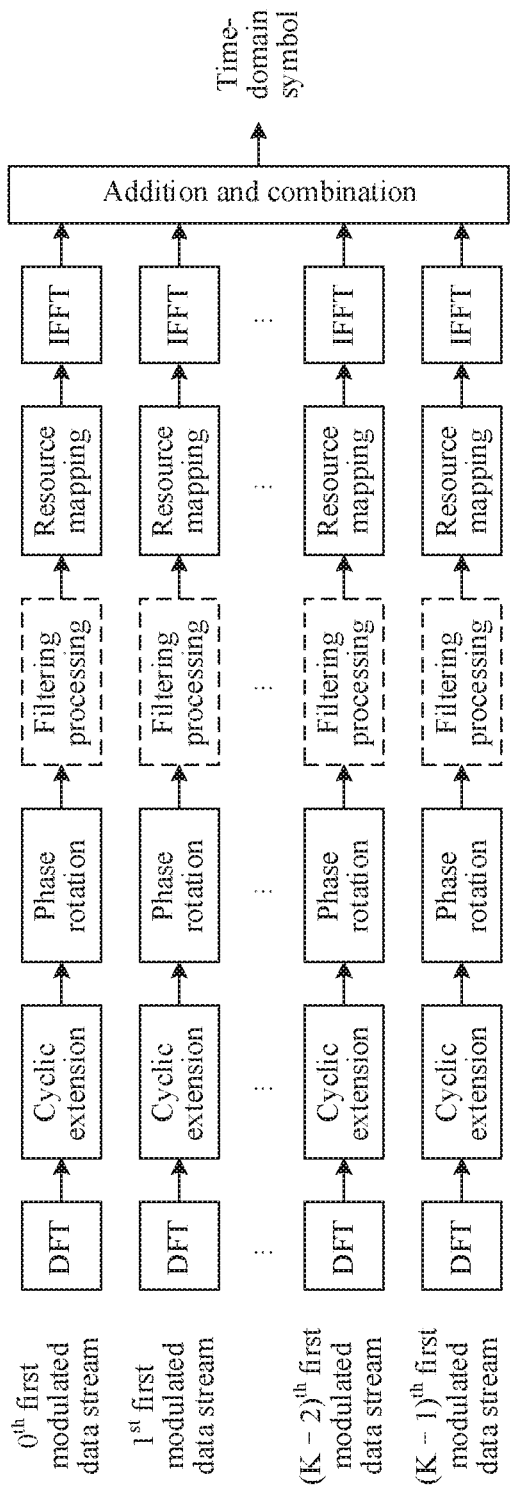
FIG. 6 is a flowchart of another data sending method according to an embodiment of this application.

For another possible implementation, refer to FIG. 6. The transmit end may perform resource mapping on the K first frequency-domain data streams, to obtain the K third frequency-domain data streams, separately perform the inverse Fourier transform on each third frequency-domain data stream, to obtain time-domain data corresponding to each third frequency-domain data stream, and then perform addition and combination on the time-domain data corresponding to the K third frequency-domain data streams, to obtain the time-domain symbol. The two implementations are equivalent. To be specific, the time-domain symbols determined in the two manners are the same. The implementation shown in FIG. 5 is less complex than the implementation shown in FIG. 6.

403. The transmit end sends the time-domain symbol.

404. The receive end receives the time-domain symbol.

The receive end may be a communications device. For example, when the transmit end is a terminal, the receive end may be a base station, or when the transmit end is a base station, the receive end may be a terminal.

The time-domain symbol may be the time-domain symbol sent by the transmit end.

405. The receive end converts the time-domain symbol into the frequency-domain signal, and then performs resource demapping on the frequency-domain signal, to obtain the K first frequency-domain data streams.

Figure 7:
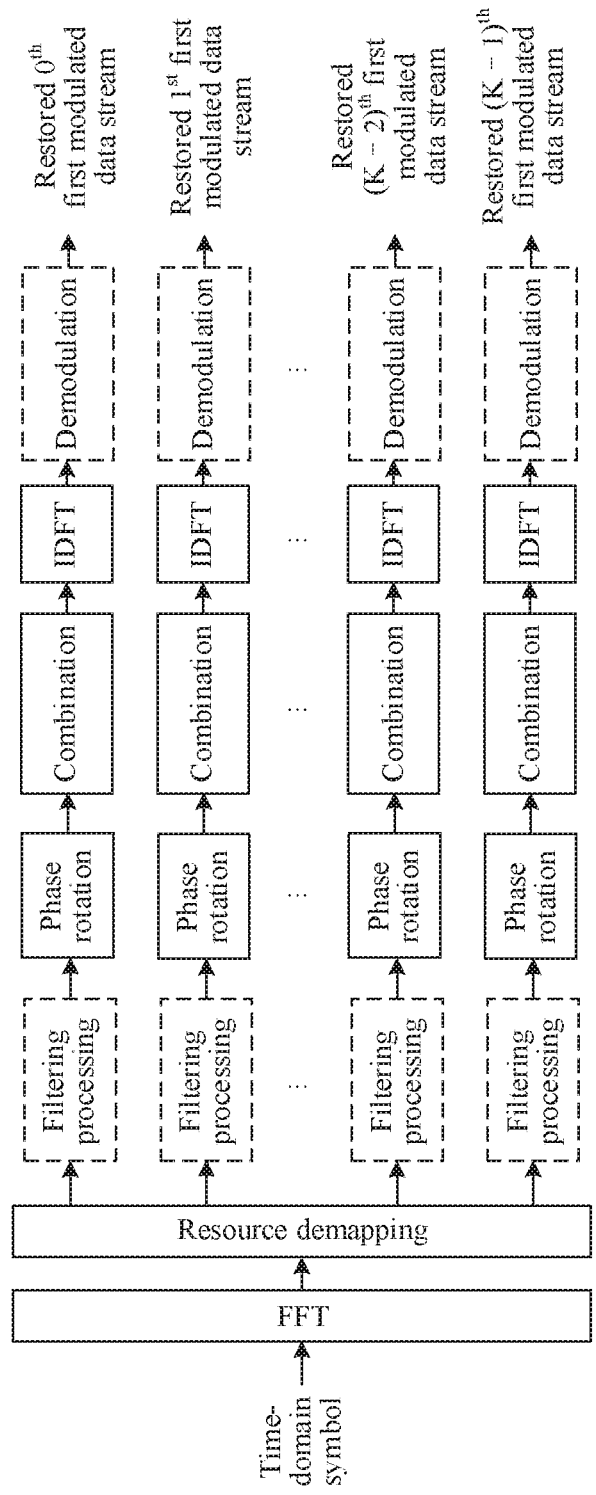
FIG. 7 is a flowchart of a data receiving method according to an embodiment of this application.

During specific implementation of step 405, referring to FIG. 7, the receive end may perform the Fourier transform on the time-domain symbol, to obtain the K third frequency-domain data streams, and perform the resource demapping on the K third frequency-domain data streams, to obtain the K first frequency-domain data streams. Specifically, the Fourier transform in this embodiment of this application may be discrete Fourier transform (discrete fourier transform, DFT for short) or fast Fourier transform (fast fourier transform, FFT for short).

The resource demapping and the resource mapping are mutually inverse operations. Specifically, the receive end may perform the resource demapping on the frequency-domain signal by using frequency-domain resource positions to which the K first frequency-domain data streams are mapped, to obtain the received K first frequency-domain data streams. To be specific, the receive end performs demapping on the $k^{th}$ third frequency-domain data stream based on the $k^{th}$ frequency-domain resource to which the $k^{th}$ first frequency-domain data stream is mapped, to obtain the received $k^{th}$ first frequency-domain data stream.

406. The receive end determines the K first modulated data streams based on the K first frequency-domain data streams, where the $k^{th}$ first modulated data stream is obtained by performing equalization and restoration processing on the $k^{th}$ first frequency-domain data stream, and the restoration processing includes the phase rotation, the combination, and the inverse Fourier transform.

The equalization operation may be performing equalization on the received K first frequency-domain data streams by using a channel estimation result and a noise estimation result of reference signals corresponding to the received K first frequency-domain data streams, to obtain the restored K first frequency-domain data streams.

The phase rotation may specifically include multiplying each element in the data stream by a predetermined phase, where the phases by which the elements are multiplied may be the same or different. When a phase factor used for phase rotation corresponding to the $k^{th}$ first frequency-domain data stream at the transmit end includes $e^{j\alpha_k n}$, optionally, a phase factor used for phase rotation corresponding to the $k^{th}$ first frequency-domain data stream at the receive end may include $e^{-j\alpha_k n}$. For example, the phase rotation may be multiplying the restored $k^{th}$ first frequency-domain data stream by the phase factor $e^{-j\alpha_k n}$, to obtain a restored data stream obtained through the cyclic extension.

Specifically, when $e^{j\alpha_k n}$ is $$e^{\frac{-j2\pi kn}{N_k}},$$

$e^{-j\alpha_k n}$ is $$e^{\frac{j2\pi nk}{N_k}};$$

when $e^{j\alpha_k n}$ is $$e^{\frac{j2\pi nk}{N_k}},$$

$e^{-j\alpha_k n}$ is $$e^{\frac{-j2\pi kn}{N_k}};$$

when $e^{j\alpha_k n}$ is $$e^{\frac{-j2\pi n(N_k-k)}{N_k}},$$

$e^{-j\alpha_k n}$ is $$e^{\frac{j2\pi n(N_k-k)}{N_k}};$$

and when $e^{j\alpha_k n}$ is $$e^{\frac{j2\pi n(N_k-k)}{N_k}},$$

$e^{-j\alpha_k n}$ is $$e^{\frac{-j2\pi n(N_k-k)}{N_k}}.$$

The combination may specifically include dividing the data stream of which the length is $N_k$ into a plurality of pieces of data, and correspondingly adding up data sampling points in the plurality of pieces of data, to obtain the data stream of which the length is $M_k$. Every $M_k$ pieces of data are selected from the data stream of which the length is $N_k$ from front to back and are used as one piece of data until all the $N_k$ pieces of data are selected, to obtain the plurality of pieces of data.

For example, when a ratio of $N_k$ to K is $M_k$, if the data stream $B_k$ of which the length is $N_k$ is $b_0, b_1, \ldots, b_{N_k-1}, b_0, b_1, \ldots b_{N_k-1}$, are evenly divided into K pieces from front to back, and the K pieces are respectively $b_0, b_1, \ldots, b_{M_k-1}$; $b_{M_k}, b_{M_k+1}, \ldots, b_{2M_k-1}; \ldots;$ and $b_{(K-1)M_k}, b_{(K-1)M_k+1}, \ldots, b_{M_kK-1}$. The data sampling points in the K pieces of data are correspondingly added up, to obtain the data stream of which the length is $M_k$. That is, $M_k$ pieces of data in the data stream of which the length is $M_k$ are respectively $b_0+b_{M_k}+ \ldots +b_{(K-1)M_k}, b_1+b_{M_k+1}+ \ldots + b_{(K-1)M_k+1}, \ldots, b_{M_k-1}+b_{2M_k-1}+ \ldots +b_{M_kK-1}$. For example, the combination operation may be combining the restored data stream obtained through the cyclic extension.

The inverse Fourier transform may specifically include performing the inverse Fourier transform on the combined data, to obtain the restored $k^{th}$ first modulated data stream, where a size of the inverse Fourier transform is $M_k$.

According to the method provided in this embodiment of this application, the data stream of which the length is $N_k$ is obtained by performing the Fourier transform and the cyclic extension in the preprocessing on the $k^{th}$ first modulated data stream of which the length is $M_k$. A time-domain waveform corresponding to the data stream of which the length is $N_k$ is approximate to a comb shape. To be specific, a part having a relatively low amplitude and a part having a relatively high amplitude alternately appear in the time-domain waveform. The phase rotation in the preprocessing can stagger parts having high amplitudes in the time-domain waveforms corresponding to the foregoing different data streams, to avoid in-phase superposition of the parts having high amplitudes in the time-domain waveforms corresponding to the K data streams. Therefore, when the K data streams are discretely mapped in frequency domain, a PAPR of converted time-domain data can be prevented from increasing. Usually, an increase in a PAPR of the data indicates an increase in a CM of the data. Therefore, according to the method provided in this embodiment of this application, when the K data streams are discretely mapped in frequency domain, a CM of the converted time-domain data can be further prevented from increasing.

Therefore, waveforms corresponding to the K first frequency-domain data streams obtained by performing preprocessing on the K first modulated data streams have a feature of low PAPR/CM, and coverage is increased when it is ensured that a frequency diversity gain is obtained through multi-stream discrete data mapping. In addition, the size of the Fourier transform corresponding to the $k^{th}$ first frequency-domain data stream is the same as the size of the $k^{th}$ first modulated data stream. Therefore, implementation complexity is relatively low.

When a transmit end needs to send data of a plurality of services at the same time, because different services have different lengths of data and each data stream carries data of one service in the foregoing manner, lengths of the K first modulated data streams are inconsistent, and lengths of the K first frequency-domain data streams are inconsistent, thereby meeting a requirement that different services have different lengths of data, and maintaining low PAPR performance while sending the data of the plurality of services.

When all the first modulated data streams have same data, the K frequency-domain data streams obtained by performing the Fourier transform and the cyclic extension on the K first modulated data streams are the same. In this case, during specific implementation, the Fourier transform operation and the cyclic extension need to be performed only once, thereby reducing calculation complexity.

Optionally, referring to FIG. 5 or FIG. 6, the preprocessing at the transmit end may further include filtering processing performed after the cyclic extension is performed. In this case, when the transmit end filters the data and the reference signal corresponding to the data by using a same filter, the receive end may not perform matched filtering (matched filtering is performing filtering processing by using a filter that is the same as the filter used by the transmit end). The reference signal corresponding to the data is a reference signal used to demodulate the data. Certainly, for example, as shown in FIG. 7, the restoration processing at the receive end may alternatively include filtering processing performed before the combination is performed. The filtering processing herein may be filtering processing that matches the filtering processing at the transmit end. The filtering processing may be frequency-domain filtering processing. The PAPR and the CM of the single-carrier data can be better decreased through the filtering processing.

Specifically, the performing, by the transmit end and the receive end, the filtering processing on the data stream may be specifically performing a dot-product operation on the data stream and a first filter. For example, the performing, by the transmit end and the receive end, the filtering processing on the data stream may be specifically performing a dot-product operation on the data stream and a root raised cosine (root raised cosine, RRC for short) filter of which a length is $N_k$ or a square root raised cosine (square root raised cosine, SRRC for short) filter of which a length is $N_k$. A roll-off factor (roll-off factor) of the filter may be predefined, or may be indicated by using the signaling.

In a possible implementation, the performing, by the transmit end, the preprocessing on the $k^{th}$ first modulated data stream may include sequentially performing the Fourier transform, the cyclic extension, the phase rotation, and the filtering processing on the $k^{th}$ first modulated data stream, to obtain the $k^{th}$ first frequency-domain data stream. In this case, the performing, by the receive end, the restoration processing on the $k^{th}$ first frequency-domain data stream may include performing the filtering processing, the phase rotation, the combination, and the inverse Fourier transform on the $k^{th}$ first frequency-domain data stream, to obtain the $k^{th}$ first modulated data stream.

In another possible implementation, the performing, by the transmit end, the preprocessing on the $k^{th}$ first modulated data stream may include sequentially performing the Fourier transform, the cyclic extension, the filtering processing, and the phase rotation on the $k^{th}$ first modulated data stream, to obtain the $k^{th}$ first frequency-domain data stream. In this case, the performing, by the receive end, the restoration processing on the $k^{th}$ first frequency-domain data stream may include performing the phase rotation, the filtering processing, the combination, and the inverse Fourier transform on the $k^{th}$ first frequency-domain data stream, to obtain the $k^{th}$ first modulated data stream.

It should be noted that, in another possible implementation, when performing the filtering processing, the transmit end may perform time-domain filtering processing instead of the frequency-domain filtering processing. In this case, before step 403, the foregoing method may further include performing, by the transmit end, time-domain filtering on the time-domain symbol. In this case, during specific implementation, step 403 may include sending, by the transmit end on a symbol, the time-domain symbol obtained through the time-domain filtering. In this case, the receive end may not perform the matched filtering, or may perform the time-domain filtering after receiving the time-domain data.

FIG. 5 and FIG. 6 show a possible procedure in which the transmit end sends the data, and FIG. 7 shows a possible procedure in which the receive end receives the data.

It should be noted that the first modulated data stream may alternatively be a reference signal sequence. In this embodiment of this application, when the data stream is a sequence including reference signals, the element in the data stream may be a reference signal.

When the element in the first modulated data stream is the reference signal, the receive end may obtain the K first frequency-domain data streams through the resource demapping, and then generate the K first frequency-domain data streams in a same way as the transmit end generates the K first frequency-domain data streams. The receive end performs operations such as channel estimation and noise estimation based on the K first frequency-domain data streams obtained through the resource demapping and the K first frequency-domain data streams generated by the receive end, and performs, based on a channel estimation result and a noise estimation result, equalization decoding on the data sent by the transmit end.

An embodiment of this application further provides a data sending and receiving method. A transmit end may send data by using step 801 to step 803 in the method shown in FIG. 8, and a receive end may receive data by using step 804 to step 806 in the method shown in FIG. 8.

Figure 8:
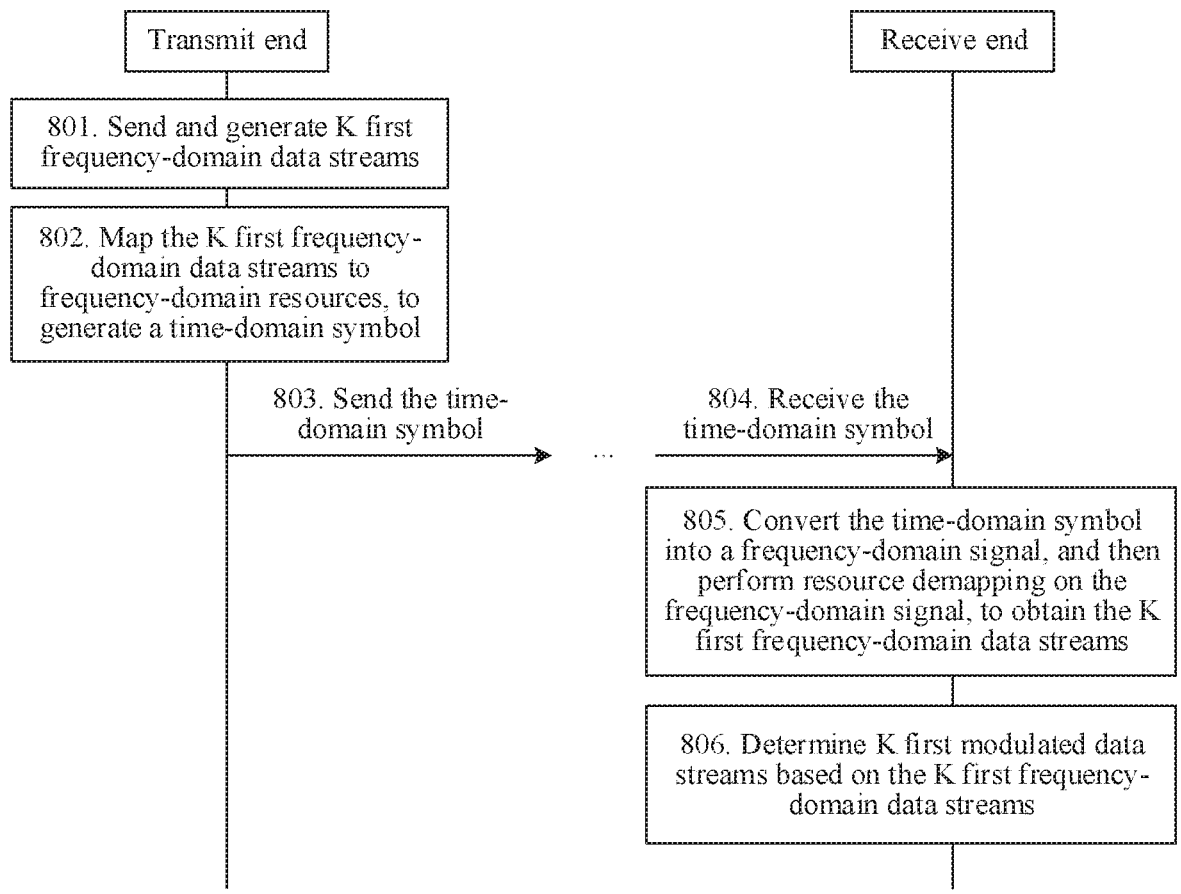
FIG. 8 is an interaction flowchart of a data sending and receiving method according to an embodiment of this application.

As shown in FIG. 8, the method includes the following steps.

801. The transmit end generates K first frequency-domain data streams, where a $k^{th}$ first frequency-domain data stream is obtained by performing preprocessing on a $k^{th}$ first modulated data stream, and the preprocessing includes at least a zero padding operation and Fourier transform; a length of the $k^{th}$ first frequency-domain data stream is $N_k$, and a length of the $k^{th}$ first modulated data stream is $M_k$; K is a positive integer greater than 1; k=0, 1, . . . , K−1; and $N_k$ and $M_k$ are positive integers.

$N_k$ is greater than $M_k$. Different first frequency-domain data streams may have a same length or different lengths, and different first modulated data streams may have a same length or different lengths.

The transmit end may be a communications device. For example, the transmit end may be a terminal or a base station. The first modulated data stream may be a sequence including data, and a length of a data stream is a quantity of elements included in the data stream. When the data stream is the sequence including the data, the element may be one piece of the data.

The transmit end may determine a value of $M_k$ in the foregoing manner 1 or manner 2.

Modulated data in the $k^{th}$ first modulated data stream may be data obtained through BPSK modulation, Pi/2-BPSK modulation, QPSK modulation, Pi/4-QPSK modulation, 16QAM, 64QAM, or the like. A size of the Fourier transform corresponding to the $k^{th}$ first modulated data stream is $M_k$.

The zero padding operation may include padding the first modulated data stream with a specific quantity of zeros, to obtain a longer data stream. Specifically, the $k^{th}$ first modulated data stream of which a length is $M_k$ is padded with $N_k-M_k$ zeros, to obtain a data stream of which a length is $N_k$ (which may be referred to as a $k^{th}$ zero padded data stream).

In this embodiment, in the zero padding operation, positions of data of different first modulated data streams in the corresponding zero padded data streams are not overlapped, that is, are different.

Optionally, in the zero padding operation corresponding to the $k^{th}$ first frequency-domain data stream, positions of the data of the $k^{th}$ first modulated data stream in the data stream obtained through the zero padding operation are consecutively arranged, or positions of the data of the $k^{th}$ first modulated data stream in the data stream obtained through the zero padding operation are arranged in a comb form. Correspondingly, at a receive end, in an extraction operation corresponding to the $k^{th}$ first frequency-domain data stream, positions of the data of the $k^{th}$ first modulated data stream in a to-be-extracted data stream are consecutively arranged; or positions of the data of the $k^{th}$ first modulated data stream to a to-be-extracted data stream are arranged in a comb form.

In a case of consecutive arrangement, for a zero padding manner, refer to Manner (1). In a case of comb arrangement, for a zero padding manner, refer to Manner (2).

Manner (1). Consecutive Arrangement

In this manner, at the transmit end, in the zero padding operation corresponding to the $k^{th}$ first frequency-domain data stream, positions of the data of the $k^{th}$ first modulated data stream in the $k^{th}$ zero padded data stream are consecutive, where a starting position is $S_{padzero}^{k}$, an end position is $E_{padzero}^{k}$, and positions of data of K first modulated data streams in corresponding zero padded data streams are different. The transmit end may determine, by using preset information, a preset rule, or signaling, positions of data of the first modulated data stream in the corresponding zero padded data stream.

For example, when the transmit end is a terminal, and the receive end is a base station, the terminal receives third signaling sent by the base station, and determines, based on the third signaling, the positions of the data of the first modulated data stream in the corresponding zero padded data stream. Information indicated in the third signaling may be the starting position $S_{padzero}^{k}$ and/or the end position $E_{padzero}^k$ of the data of the $k^{th}$ first modulated data stream in the corresponding zero padded data stream. The third signaling may be RRC, a MAC CE, UCI, DCI, or the like.

In different cases, the positions of the data of the first modulated data stream in the corresponding zero padded data stream may be different in Manner (1). The following separately describes the cases.

Case 1: Lengths of the K first frequency-domain data streams are consistent, and lengths of the K first modulated data streams are consistent.

In this case, it is considered that the length of the $k^{th}$ first frequency-domain data stream is $N_k=N$, and the length of the $k^{th}$ first modulated data stream is $M_k=M$. It is assumed that elements in the $k^{th}$ zero padded data stream that is obtained through the zero padding operation and of which a length is N are numbered from 0 to N−1, the positions of the data of the $k^{th}$ first modulated data stream in the $k^{th}$ zero padded data stream may be implicitly determined by k as kM, kM+1, kM+2, . . . , kM+M−1. If an $m^{th}$ element in the $k^{th}$ first modulated data stream is $d^k(m)$, where m=0, 1, 2, . . . , M−1, and an $n^{th}$ element in the $k^{th}$ zero padded data stream is $d_{padzero}^k(n)$ where n=0, 1, 2, . . . , N−1, $$d_{padzero}^k(n) = \begin{cases} d^k(m), & n = kM + m \\ 0, & n \neq kM + m \end{cases}.$$

It is easy to learn that the positions of the data of different first modulated data streams in the K first modulated data streams in the corresponding zero padded data streams are not overlapped.

Case 2: Lengths of the K first frequency-domain data streams are consistent, and lengths of the K first modulated data streams are inconsistent.

The length of the $k^{th}$ first modulated data stream is $M_k$, and the length of the $k^{th}$ first frequency-domain data stream is $N_k=N$. In this case, if $\Sigma_{k=0}^{K-1} M_k = N$, that is, a sum of lengths of the K first modulated data streams is N, the $k^{th}$ first modulated data stream is padded with $N-M_k$ zeros, to obtain the $k^{th}$ zero padded data stream of which a length is N. If an $m^{th}$ element in the $k^{th}$ first modulated data stream is $d^k(m)$, where m=0, 1, 2, . . . , $M_k$−1, and an $n^{th}$ element in the $k^{th}$ zero padded data stream is $d_{padzero}^k(n)$, where n=0, 1, 2, . . . , N−1, an implementation may be $$d_{padzero}^k(n) = \begin{cases} d^k(m), & n = M_{sum} + m \\ 0, & n \neq M_{sum} + m \end{cases}.$$

The $k^{th}$ first modulated data stream $M_{sum}^k$ is a sum of lengths of first k−1 first modulated data streams, that is, $M_{sum}^k = \Sigma_{l=0}^{K-1} M_l$. Specifically, for a $0^{th}$ first modulated data stream, $M_{sum}^k=0$. It is easy to learn that the positions of the data of different first modulated data streams in the K first modulated data streams in the corresponding zero padded data streams are not overlapped.

Case 3: Lengths of the K first frequency-domain data streams are inconsistent, and lengths of the K first modulated data streams are inconsistent.

The length of the $k^{th}$ first modulated data stream is $M_k$, and the length of the $k^{th}$ first frequency-domain data stream is $N_k$. If $M_k=N_k/K$, that is, a length of each first modulated data stream is 1/K of a length of the corresponding zero padded data stream, the $k^{th}$ first modulated data stream is padded with $N_k-M_k$ zeros, to obtain the $k^{th}$ zero padded data stream of which a length is $N_k$. If an $m^{th}$ element in the $k^{th}$ first modulated data stream is $d^k(m)$, where m=0, 1, 2, . . . , $M_k$−1, and an $n^{th}$ element in the $k^{th}$ zero padded data stream is $d_{padzero}^k(n)$, where n=0, 1, 2, . . . , $N_k$−1, in an implementation, $$d_{padzero}^k(n) = \begin{cases} d^k(m), & n = kM_k + m \\ 0, & n \neq kM_k + m \end{cases}.$$

In this case, that the positions of the data of different first modulated data streams in the K first modulated data streams in the corresponding zero padded data streams are not overlapped means that relative positions are different. The relative positions may be described as ratios of the positions of the data of different first modulated data streams in the K first modulated data streams in the corresponding zero padded data streams to the lengths of the zero padded data streams. For example, when K=2, the length of the first modulated data stream is a half of the length of the zero padded data stream, and the $0^{th}$ first modulated data stream occupies a first half of positions in the corresponding zero padded data stream, that is, first $M_0$ positions. In this case, a relative position is greater than or equal to 0 and less than ½. The $1^{st}$ first modulated data stream occupies a last half of positions in the corresponding zero padded data stream, that is, last $M_1$ positions. In this case, a relative position is greater than or equal to ½ and less than 1. The two data streams have different relative positions.

In this case, optionally, the $k^{th}$ data stream may be multiplied by a constant $W_K$, so that power of different data streams is consistent. $W_K$ may be implicitly indicated, for example, may be implicitly determined by using $M_k$, or may be indicated by using signaling. For example, when K=2, a length of the $0^{th}$ first modulated data stream is $M_0$=12, and a length of the $1^{st}$ first modulated data stream is $M_1$=24, a constant factor of the $0^{th}$ first modulated data stream may be sqrt(2), and a constant factor of the $1^{st}$ first modulated data stream may be 1, where "sqrt" represents "radical sign".

Manner (2). Comb Arrangement

In this manner, in the zero padding operation corresponding to the $k^{th}$ first frequency-domain data stream, positions of the data of the $k^{th}$ first modulated data stream in the $k^{th}$ zero padded data stream are arranged in a comb form. A comb size (comb size) is a distance between two pieces of neighboring data of the first modulated data stream in the zero padded data stream, and a value of the comb size is K, that is, the comb size is consistent with the quantity K of the data streams. A starting position (which may also be referred to as a specific comb value) of the data of the $k^{th}$ first modulated data stream in the $k^{th}$ zero padded data stream is $K_{comb}^k$, where $K_{comb}^k$ is one of 0, 1, 2, . . . , K−1. For example, the positions of the data of the $k^{th}$ first modulated data stream of which a length is $M_k$ in the $k^{th}$ zero padded data stream may be denoted as $K_{comb}^k, K_{comb}^k+K, K_{comb}^k+2K, K_{comb}^k+3K, \ldots, K_{comb}^k+(M_k-1)K$. The positions of the data of different first modulated data streams in the corresponding zero padded data streams are not overlapped, that is, different data streams have different specific comb values $K_{comb}^k$.

When lengths of the K first frequency-domain data streams are consistent, and lengths of the K first modulated data streams are consistent, the length of the $k^{th}$ first frequency-domain data stream is $N_k=N$, and the length of the $k^{th}$ first modulated data stream is $M_k=M$. It is assumed that elements in the $k^{th}$ zero padded data stream that is obtained through the zero padding operation and of which a length is N are numbered from 0 to N−1, the positions of the data of the $k^{th}$ first modulated data stream in the $k^{th}$ zero padded data stream may be implicitly determined by k as k, K+k, 2K+k, . . . , (M−1)K+k, that is, the specific comb value $K_{comb}^{k}$=k. If an $m^{th}$ element in the $k^{th}$ first modulated data stream is $d^k(m)$, where m=0, 1, 2, . . . , M−1, and an $n^{th}$ element in the $k^{th}$ zero padded data stream is $d_{padzero}^{k}(n)$, where n=0, 1, 2, . . . , N−1.

$$d_{padzero}^{k}(n) = \begin{cases} d^k(m), & n = mK + k \\ 0, & n \neq mK + k \end{cases}.$$

The Fourier transform may include performing the Fourier transform on the $k^{th}$ zero padded data stream of which a length is $N_k$, to obtain the $k^{th}$ first frequency-domain data stream, where the size of the Fourier transform is $N_k$.

For example, if an $n^{th}$ element in the $k^{th}$ zero padded data stream is $d_{padzero}^{k}(n)$, where n=0, 1, 2, . . . , $N_k$−1, and an $i^{th}$ element in the $k^{th}$ first frequency-domain data stream is $D^k(i)$, where i=0, 1, 2, . . . , $N_k$−1, a Fourier transform process may be described as:

$$D^k(i) = \frac{1}{\sqrt{N_k}} \sum_{n=0}^{N_k-1} d_{padzero}^{k}(n) e^{-j\frac{2\pi i n}{N_k}}.$$

The foregoing preprocessing (including the zero padding operation and the Fourier transform) process may be implemented by using an expression. By using an example in which the lengths of the K first frequency-domain data streams are consistent, lengths of the K first modulated data streams are consistent, and the positions of the data of the $k^{th}$ first modulated data stream in the $k^{th}$ zero padded data stream are consecutively arranged, one expression manner is:

$$D^k(i) = \frac{1}{\sqrt{N_k}} \sum_{m=0}^{M_k-1} d^k(m) e^{-j\frac{2\pi i(kM+m)}{N_k}}.$$

802. The transmit end maps the K first frequency-domain data streams to frequency-domain resources, to generate a time-domain symbol.

During specific implementation of step 802, resource mapping may be performed on the K first frequency-domain data streams, and then inverse Fourier transform is performed on the K first frequency-domain data streams, to obtain the time-domain symbol.

For specific implementation of step 802, refer to the foregoing step 402. Details are not described herein again.

Figure 9:
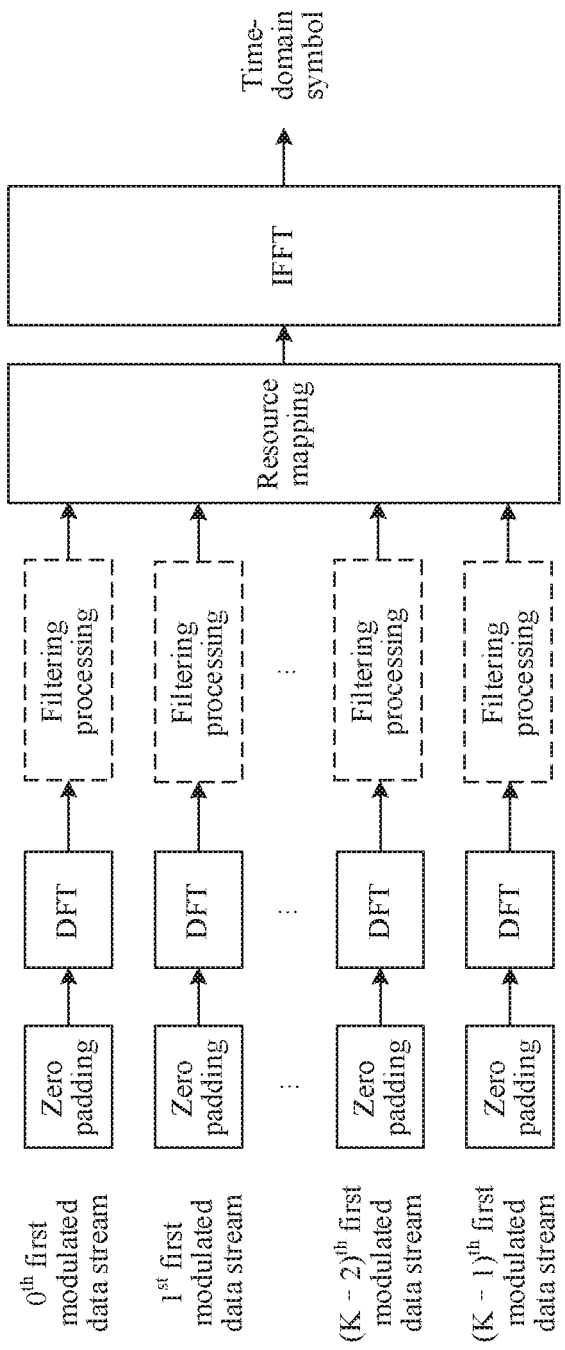
FIG. 9 is a flowchart of a data sending method according to an embodiment of this application.

During specific implementation of step 802, for a possible implementation, refer to FIG. 9. The transmit end may perform the resource mapping on the K first frequency-domain data streams, to obtain K third frequency-domain data streams, where a frequency-domain signal includes the K third frequency-domain data streams, and perform the inverse Fourier transform on the frequency-domain signal, to obtain the time-domain symbol.

Figure 10:
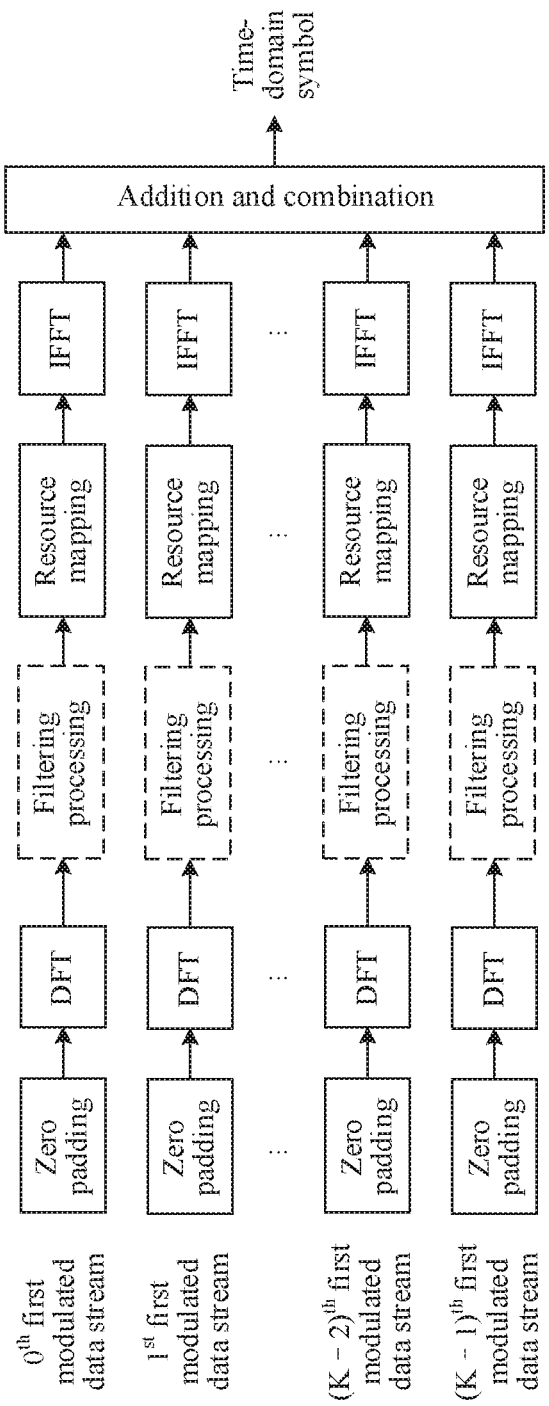
FIG. 10 is a flowchart of another data sending method according to an embodiment of this application.

For another possible implementation, refer to FIG. 10. The transmit end may perform the resource mapping on the K first frequency-domain data streams, to obtain K third frequency-domain data streams, separately perform the inverse Fourier transform on each third frequency-domain data stream, to obtain time-domain data corresponding to each third frequency-domain data stream, and then perform addition and combination on the time-domain data corresponding to the K third frequency-domain data streams, to obtain the time-domain symbol. The two implementations are equivalent. To be specific, the tune-domain symbols determined in the two manners are the same. The implementation shown in FIG. 9 is less complex than the implementation shown in FIG. 10.

803. The transmit end sends the time-domain symbol.

Optionally, in this embodiment of this application, when average power on each subcarrier is normalized, the transmit end needs to perform power adjustment by multiplying each data stream by a corresponding constant factor $\tilde{W}_k$, where $\tilde{W}_k$=sqrt($N_k/M_k$).

Optionally, the K first modulated data streams may be obtained by using a second modulated data stream. Specifically, the $k^{th}$ first modulated data stream is a part of the second modulated data stream, that is, the second modulated data stream includes the K first modulated data streams.

804. The receive end receives the time-domain symbol.

The receive end may be a communications device. For example, when the transmit end is a terminal, the receive end may be a base station, or when the transmit end is a base station, the receive end may be a terminal.

The time-domain symbol may be the time-domain symbol sent by the transmit end.

805. The receive end converts the time-domain symbol into the frequency-domain signal, and then performs resource demapping on the frequency-domain signal, to obtain the K first frequency-domain data streams.

Figure 11:
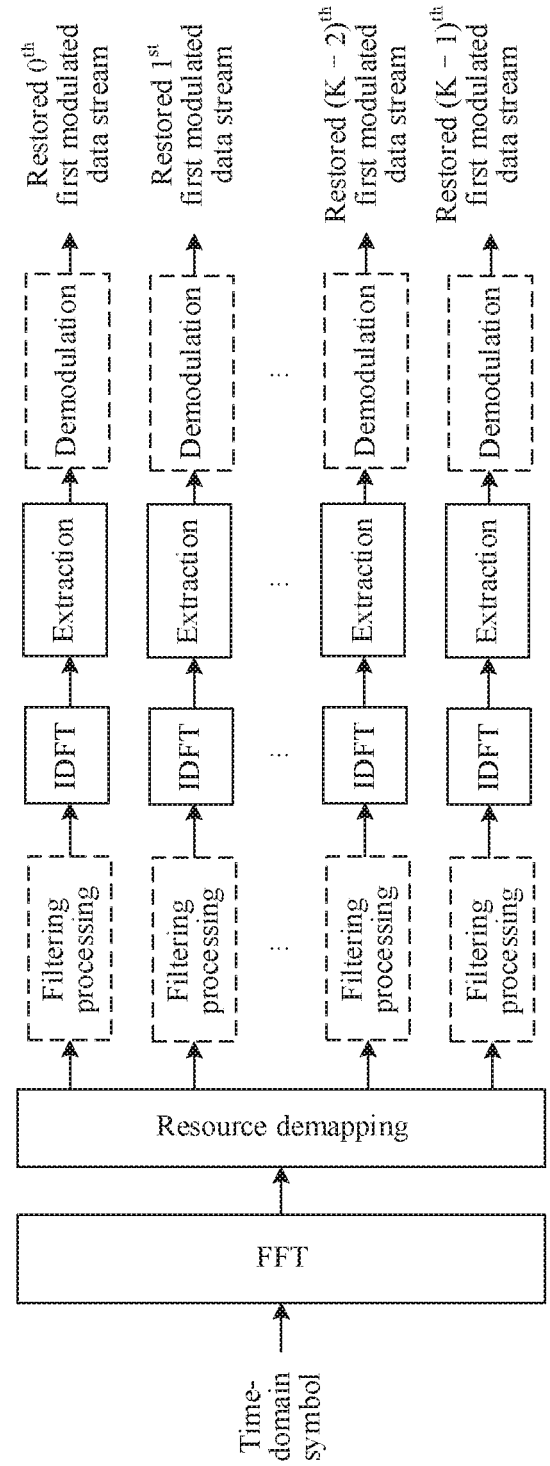
FIG. 11 is a flowchart of a data receiving method according to an embodiment of this application.

During specific implementation of step 805, referring to FIG. 11, the Fourier transform may be performed on the time-domain symbol, to obtain the frequency-domain signal. The resource demapping and the resource mapping are mutually inverse operations. Specifically, the receive end may perform the resource demapping on the frequency-domain signal by using frequency-domain resource positions to which the K first frequency-domain data streams are mapped, to obtain the received K first frequency-domain data streams. To be specific, the receive end performs demapping on the frequency-domain signal based on the $k^{th}$ frequency-domain resource to which the $k^{th}$ first frequency-domain data stream is mapped, to obtain the received $k^{th}$ first frequency-domain data stream.

806. The receive end determines the K first modulated data streams based on the K first frequency-domain data streams, where the $k^{th}$ first modulated data stream is obtained by performing equalization and restoration processing on the $k^{th}$ first frequency-domain data stream, and the restoration processing includes the inverse Fourier transform and the extraction operation.

The equalization operation may be performing equalization on the received K first frequency-domain data streams by using a channel estimation result and a noise estimation result of reference signals corresponding to the received K first frequency-domain data streams, to obtain the restored K first frequency-domain data streams.

The inverse Fourier transform may include performing the inverse Fourier transform on the restored $k^{th}$ first frequency-domain data stream, to obtain the restored $k^{th}$ zero padded data stream, where a size of the inverse Fourier transform is $N_k$.

The extraction operation may specifically include extracting an element at a specific position in the data stream obtained through the inverse Fourier transform, to obtain the first modulated data stream. The specific position is a position of the data of the first modulated data stream in the corresponding zero padded data stream. Specifically, the restored $k^{th}$ zero padded data stream is extracted based on the position of the first modulated data stream in the zero padded data stream, to obtain the restored $k^{th}$ first modulated data stream.

According to the method provided in this embodiment of this application, the zero padding operation and the Fourier transform are performed on the first modulated data stream, to obtain the first frequency-domain data stream; and the resource mapping is performed on the first frequency-domain data stream, and then the first frequency-domain data stream is converted into the time-domain symbol through the inverse Fourier transform. Because the positions of the data of different first modulated data streams in the K first modulated data streams in the corresponding zero padded data streams are not overlapped, there is a low probability that peaks of time-domain symbols of different data streams obtained through the inverse Fourier transform after the resource mapping is performed on different first frequency-domain data streams are overlapped, that is, there is a low probability that peaks are superposed in a same direction, thereby decreasing a PAPR of the time-domain symbols converted from the K first frequency-domain data streams, so that the PAPR is close to a PAPR of single-carrier data.

In addition, frequency-domain resources to which different first frequency-domain data streams are mapped are not overlapped. Therefore, a receiver can obtain a frequency domain diversity gain when demodulating the data, thereby improving demodulation performance.

On the other hand, according to the method provided in this embodiment of this application, an existing single-carrier sending process is slightly changed, and an existing hardware device is slightly affected, so that implementation costs of a hardware device can be reduced.

When a transmit end needs to send data of a plurality of services at the same time, because different services have different lengths of data and each data stream carries data of one service in the foregoing manner, lengths of the K first modulated data streams are inconsistent, and lengths of the K first frequency-domain data streams are inconsistent, thereby meeting a requirement that different services have different lengths of data, and maintaining low PAPR performance while sending the data of the plurality of services.

In the zero padding operation corresponding to the $k^{th}$ first frequency-domain data stream, when the positions of the data of the $k^{th}$ first modulated data stream in the $k^{th}$ zero padded data stream are consecutive, a CM of the time-domain symbols converted from the K first frequency-domain data streams is close to a CM of single-carrier data. Especially when the Pi/2-BPSK modulation is used, single-carrier data in an NR system may be filtered by a filter, to further reduce the PAPR and the CM, thereby improving coverage performance. In this case, the preprocessing may further include a filtering operation, so that the PAPR and the CM of the time-domain symbols converted from the K first frequency-domain data streams corresponding to the Pi/2-BPSK modulation are close to the PAPR and the CM of the single-carrier data in the NR that is filtered by the filter in the Pi/2-BPSK modulation, thereby obtaining a frequency domain diversity gain while ensuring coverage performance. This improves demodulation performance.

Optionally, in the method provided in this embodiment of this application, referring to FIG. 9 or FIG. 10, the preprocessing at the transmit end further includes filtering processing performed after the Fourier transform is performed. In this case, when the transmit end filters the data and the reference signal corresponding to the data by using a same filter, the receive end may not perform matched filtering. Certainly, referring to FIG. 11, the restoration processing at the receive end may alternatively include filtering processing performed before the inverse Fourier transform is performed. The filtering processing herein may be filtering processing that matches the filtering processing at the transmit end. The filtering processing may be frequency-domain filtering processing. The PAPR and the CM of the single-carrier data can be better decreased through the filtering processing.

Specifically, the performing, by the transmit end and the receive end, the filtering processing on the data stream may be specifically performing a dot-product operation on the data stream and a first filter. For example, the performing, by the transmit end and the receive end, the filtering processing on the data stream may be specifically performing a dot-product operation on the data stream and an RRC filter of which a length is $N_k$ or an SRRC filter of which a length is $N_k$. A roll-off factor (roll-off factor) of the filter may be predefined, or may be indicated by using the signaling.

It should be noted that, in another possible implementation, when performing the filtering processing, the transmit end may perform time-domain filtering processing instead of the frequency-domain filtering processing. In this case, before step 803, the foregoing method may further include performing, by the transmit end, time-domain filtering on the time-domain symbol. In this case, during specific implementation, step 803 may include sending, by the transmit end on a symbol, the time-domain symbol obtained through the time-domain filtering. In this case, the receive end may not perform the matched filtering, or may perform the time-domain filtering after receiving the time-domain data.

FIG. 9 and FIG. 10 show a possible procedure in which the transmit end sends the data, and FIG. 11 shows a possible procedure in which the receive end receives the data.

It should be noted that the first modulated data stream may alternatively be a reference signal sequence. In this embodiment of this application, when the data stream is a sequence including reference signals, the element in the data stream may be a reference signal.

When the element in the first modulated data stream is the reference signal, the receive end may obtain the received. K first frequency-domain data streams through the resource demapping, and then generate the K first frequency-domain data streams in a same way as the transmit end generates the K first frequency-domain data streams. The receive end performs operations such as channel estimation and noise estimation by using the K first frequency-domain data streams obtained through the resource demapping and the generated. K first frequency-domain data streams, and performs, based on a channel estimation result and a noise estimation result, equalization decoding on the data sent by the transmit end.

An embodiment of this application further provides a data sending and receiving method. A transmit end may send data by using step 1201 to step 1203 in the method shown in FIG. 12, and a receive end may receive data by using step 1204 to step 1206 in the method shown in FIG. 12.

Figure 12:
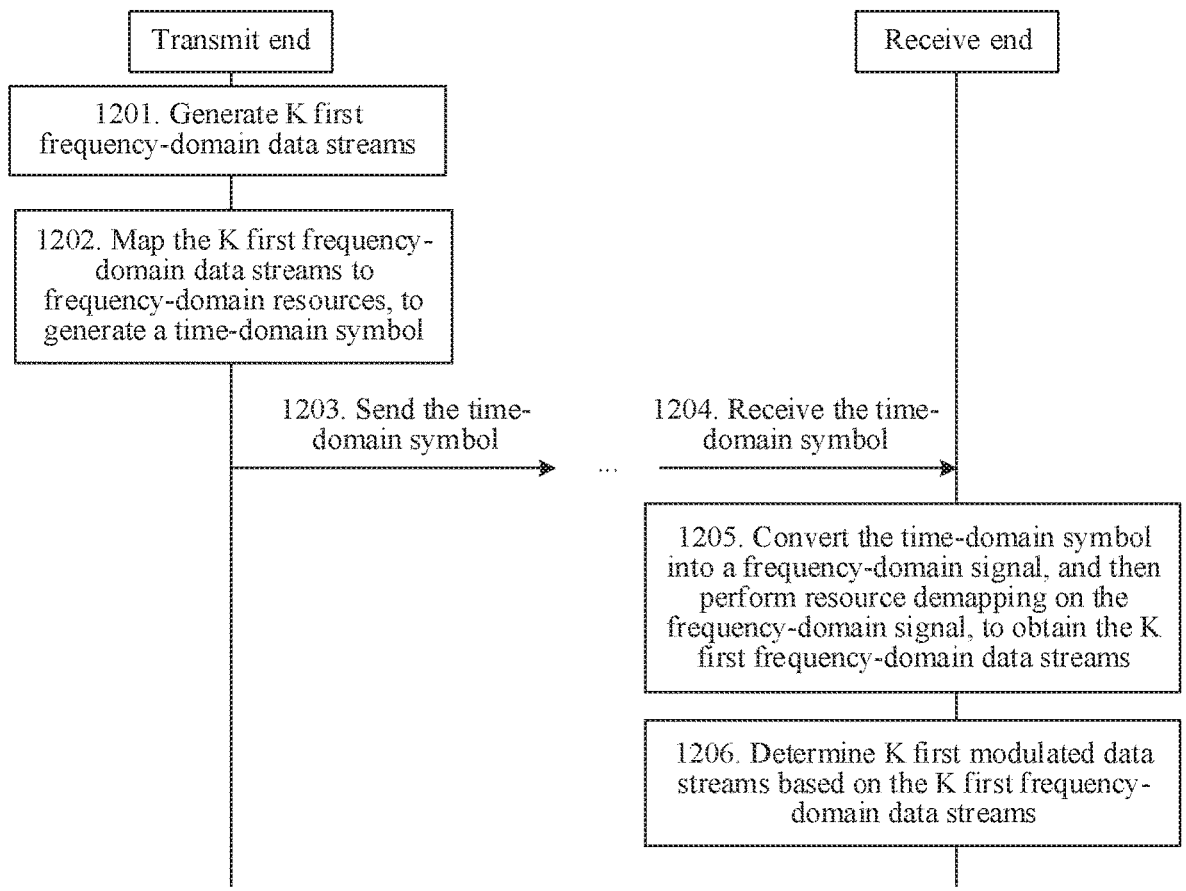
FIG. 12 is an interaction flowchart of a data sending and receiving method according to an embodiment of this application.

As shown in FIG. 12, the method includes the following steps.

1201. The transmit end generates K first frequency-domain data streams, where a $k^{th}$ first frequency-domain data stream is obtained by performing preprocessing on a $k^{th}$ first modulated data stream, and the preprocessing includes at least a zero padding operation, Fourier transform, and phase rotation; a length of the $k^{th}$ first frequency-domain data stream is $N_k$, and a length of the $k^{th}$ first modulated data stream is $M_k$; K is a positive integer greater than 1; k=0, 1, ..., K−1; and $N_k$ and $M_k$ are positive integers.

The transmit end may be a communications device. For example, the transmit end may be a terminal or a base station. The first modulated data stream may be a sequence including data, and a length of a data stream is a quantity of elements included in the data stream. When the data stream is the sequence including the data, the element may be one piece of the data.

$N_k$ is greater than $M_k$. Different first frequency-domain data streams may have a same length or different lengths, and different first modulated data streams may have a same length or different lengths.

The transmit end may determine a value of $M_k$ in the foregoing manner 1 or manner 2.

Modulated data in the $k^{th}$ first modulated data stream may be data obtained through BPSK modulation, Pi/2-BPSK modulation, QPSK modulation, Pi/4-QPSK modulation, 16QAM, 64QAM, or the like.

The zero padding operation may include padding the first modulated data stream with a specific quantity of zeros, to obtain a longer data stream. Specifically, the $k^{th}$ first modulated data stream of which a length is $M_k$ is padded with $N_k - M_k$ zeros, to obtain a data stream of which a length is $N_k$ (which may be referred to as a $k^{th}$ zero padded data stream).

In this embodiment, in the zero padding operation, positions of data of different first modulated data streams in the corresponding zero padded data streams are overlapped, that is, are the same. Optionally, starting positions and/or end positions of data of the K first modulated data streams in corresponding data streams obtained through the zero padding operation are the same.

Optionally, in the zero padding operation corresponding to the $k^{th}$ first frequency-domain data stream, positions of the data of the $k^{th}$ first modulated data stream in the data stream obtained through the zero padding operation are consecutively arranged; or positions of the data of the $k^{th}$ first modulated data stream in the data stream obtained through the zero padding operation are arranged in a comb form. Correspondingly, at a receive end, in an extraction operation corresponding to the $k^{th}$ first frequency-domain data stream, positions of the data of the $k^{th}$ first modulated data stream in a to-be-extracted data stream are consecutively arranged; or positions of the data of the $k^{th}$ first modulated data stream in a to-be-extracted data stream are arranged in a comb form.

In a case of consecutive arrangement, for a zero padding manner, refer to Manner (3). In a case of comb arrangement, for a zero padding manner, refer to Manner (4).

Manner (3). Consecutive Arrangement

In this manner, at the transmit end, in the zero padding operation corresponding to the $k^{th}$ first frequency-domain data stream, positions of the data of the $k^{th}$ first modulated data stream in the $k^{th}$ zero padded data stream are consecutive, where a starting position is $S_{padzero}^k$, an end position is $E_{padzero}^k$, and positions of data of K first modulated data streams in corresponding zero padded data streams are the same, that is, $S_{padzero}^k = S_{padzero}$ and/or $E_{padzero}^k = E_{padzero}$. The transmit end may, determine, by using preset information, a preset rule, or signaling, positions of data of the first modulated data stream in the corresponding zero padded data stream. For a specific example, refer to the foregoing manner (1).

In different cases, the positions of the data of the first modulated data stream in the corresponding zero padded data stream may be the same in Manner (3). The following separately describes the cases.

Case 1: Lengths of the K first frequency-domain data streams are consistent, and lengths of the K first modulated data streams are consistent.

In this case, it is considered that the length of the $k^{th}$ first frequency-domain data stream is $N_k = N$, and the length of the $k^{th}$ first modulated data stream is $M_k = M$. It is assumed that elements in the $k^{th}$ zero padded data stream that is obtained through the zero padding operation and of which a length is N are numbered from 0 to N−1, starting positions and/or end positions of the data of the K first modulated data streams in corresponding zero padded data streams are the same. For example, the starting position is predefined as 0, a mapped position may be determined as 0, 1, 2, 3, ..., and M−1. If an $m^{th}$ element in the $k^{th}$ first modulated data stream is $d^k(m)$, where m=0, 1, 2, ..., M−1, and an $n^{th}$ element in the $k^{th}$ zero padded data stream is $d_{padzero}^k(n)$, where n=0, 1, 2, ..., N−1, $$d_{padzero}^k(n) = \begin{cases} d^k(m), & n = m \\ 0, & n \neq m \end{cases}.$$

It is easy to learn that the positions of the data of different first modulated data streams in the K first modulated data streams in the corresponding zero padded data streams are the same.

Case 2: Lengths of the K first frequency-domain data streams are consistent, and lengths of the K first modulated data streams are inconsistent.

The length of the $k^{th}$ first modulated data stream is $M_k$, and the length of the $k^{th}$ first frequency-domain data stream is $N_k = N$. In this case, if $\Sigma_{k=0}^{K-1} M_k = N$, that is, a sum of lengths of the K first modulated data streams is N, the $k^{th}$ first modulated data stream is padded with $N - M_k$ zeros, to obtain the $k^{th}$ zero padded data stream of which a length is N. In a possible manner, starting positions of the data of the K first modulated data streams in the zero padded data streams are the same, that is, $S_{padzero}^k = S_{padzero}$.

For example, if an $m^{th}$ element in the $k^{th}$ first modulated data stream is $d^k(m)$, where m=0, 1, 2, ..., $M_k$−1, and an $n^{th}$ element in the $k^{th}$ zero padded data stream is $d_{padzero}^k(n)$, where n=0, 1, 2, ..., N−1, when the starting positions are the same, it can be described as $$d_{padzero}^k(n) = \begin{cases} d^k(m), & n = S_{padzero} + m \\ 0, & n \neq S_{padzero} + m \end{cases}.$$

It is easy to learn that the starting positions of the data of different first modulated data streams in the K first modulated data streams in the corresponding zero padded data streams are the same.

Case 3: Lengths of the K first frequency-domain data streams are inconsistent, and lengths of the K first modulated data streams are inconsistent.

The length of the $k^{th}$ first modulated data stream is $M_k$, and the length of the $k^{th}$ first frequency-domain data stream is $N_k$. If $M_k = N_k/K$, that is, a length of each first modulated data stream is 1/K of a length of the corresponding zero padded data stream, the $k^{th}$ first modulated data stream is padded with $N_k-M_k$ zeros, to obtain the $k^{th}$ zero padded data stream of which a length is $N_k$. Starting positions of the data of the K first modulated data streams in the zero padded data streams are the same, that is, $S_{padzero}{}^k = S_{padzero}$.

If an $m^{th}$ element in the $k^{th}$ first modulated data, stream is $d^k(m)$, where m=0, 1, 2, . . . , $M_k-1$, and an $n^{th}$ element in the $k^{th}$ zero padded data stream is $d_{padzero}{}^k(n)$, where n=0, 1, 2, . . . , $N_k-1$, in an implementation, $$d_{padzero}^k(n) = \begin{cases} d^k(m), & n = S_{padzero} + m \\ 0, & n \neq S_{padzero} + m \end{cases}.$$

In this case, that the positions of the data of different first modulated data streams in the K first modulated data streams in the corresponding zero padded data streams are the same means that relative positions are the same. The relative positions may be described as ratios of the positions of the data of different first modulated data streams in the K first modulated data streams in the corresponding zero padded data streams to the lengths of the zero padded data streams. For example, when K=2, the length of the first modulated data stream is a half of the length of the zero padded data stream, and the $0^{th}$ first modulated data stream occupies a first half of positions in the corresponding zero padded data stream, that is, first $M_0$ positions. In this case, a relative position is greater than or equal to 0 and less than ½. Similarly, the $1^{st}$ first modulated data stream occupies the first half of positions in the corresponding zero padded data stream, that is, the first $M_1$ positions. In this case, similarly, a relative position is greater than or equal to 0 and less than ½. The two data streams have a same relative starting position.

In this case, optionally, the $k^{th}$ data stream may be multiplied by a constant $W_K$, so that power of different data streams is consistent. $W_k$ may be implicitly indicated, for example, may be implicitly determined by using $M_k$, or may be determined through notification by using signaling. For example, when K=2, a length of the $0^{th}$ first modulated data stream is $M_0=12$, and a length of the $1^{st}$ first modulated data stream is $M_1=24$, a constant factor of the $0^{th}$ first modulated data stream may be sqrt(2), and a constant factor of the first modulated data stream may be 1.

Manner (4). Comb Arrangement

In this manner, in the zero padding operation corresponding to the $k^{th}$ first frequency-domain data stream, positions of the data of the $k^{th}$ first modulated data stream in the $k^{th}$ zero padded data stream are arranged in a comb form. A comb size (comb size) is K, that is, the comb size is consistent with the quantity K of the data streams and a specific comb value is $K_{comb}{}^k$, where $K_{comb}{}^k$ is one of 0, 1, 2, . . . , K−1. For example, the positions of the data of the $k^{th}$ first modulated data stream of which a length is $M_k$ in the $k^{th}$ zero padded data stream may be denoted as $K_{comb}{}^k$, $K_{comb}{}^k+K, K_{comb}{}^k+2K, K_{comb}{}^k+3K, \ldots, K_{comb}{}^k+(M_k-1)K$. The positions of the data of different first modulated data streams in the corresponding zero padded data streams are overlapped, that is, different data streams have a same specific comb value $K_{comb}{}^k$, that is, $K_{comb}{}^k = K_{comb}$.

When lengths of the K first frequency-domain data streams are consistent, and lengths of the K first modulated data streams are consistent, the length of the $k^{th}$ first frequency-domain data stream is $N_k=N$, and the length of the $k^{th}$ first modulated data stream is $M_k=M$. It is assumed that elements in the $k^{th}$ zero padded data stream that is obtained through the zero padding operation and of which a length is N are numbered from 0 to N−1, a specific comb value to which the $k^{th}$ first modulated data stream is mapped in the $k^{th}$ zero padded data stream may be predefined as 0, that is, the positions are 0, K, 2K, 3K, . . . , (M−1) K. If an $m^{th}$ element in the $k^{th}$ first modulated data stream is $d^k(n)$, where m=0, 1, 2, . . . , M−1, and an $n^{th}$ element in the $k^{th}$ zero padded data stream is $d_{padzero}{}^k(n)$, where n=0, 1, 2, . . . , N−1, $$d_{padzero}^k(n) = \begin{cases} d^k(m), & n = mK \\ 0, & n \neq mK \end{cases}.$$

The Fourier transform may include performing the Fourier transform on the $k^{th}$ zero padded data stream of which the length is $N_k$, where the size of the Fourier transform is $N_k$.

For example, if an $n^{th}$ element in the $k^{th}$ zero padded data stream is $d_{padzero}{}^k(n)$, where n=0, 1, 2, . . . , $N_k-1$, and an $i^{th}$ element in a data stream obtained through the Fourier transform is $D^k(i)$, where i=0, 1, 2, . . . , $N_k-1$, a Fourier transform process may be described as:

$$D^k(i) = \frac{1}{\sqrt{N_k}} \sum_{n=0}^{N_k-1} d_{padzero}^k(n) e^{-j\frac{2\pi i n}{N_k}}.$$

The phase rotation may specifically include multiplying each element in the data stream by a phase $\varphi_k$, where the phases by which the elements are multiplied may be the same or different. Specifically, each element of a data stream obtained by performing the Fourier transform on each zero padded data stream is multiplied by the phase $\varphi_k$ to obtain a corresponding first frequency-domain data stream. The transmit end may obtain the phase factor $\varphi_k$ of each data stream by using signaling. For example, the phase factor $\varphi_k$ may be obtained by using at least one of the signaling such as DCI, RRC, a MAC CE, and UCI, or may be determined in an implicit manner.

Optionally, a phase factor used for the phase rotation corresponding to the $k^{th}$ data stream may be $\varphi_k = e^{j\theta_k n}$, where n=0, 1, . . . , $N_k-1$. Specifically, a phase factor used for the phase rotation corresponding to the $n^{th}$ element in the data stream obtained by performing the Fourier transform on the $k^{th}$ zero padded data stream is $e^{j\theta_k n}$, that is, phase factors by which the $N_k$ elements in the data stream obtained through the Fourier transform are multiplied are related to positions of the elements in the data stream. If the $n^{th}$ element in the data stream obtained by performing the Fourier transform on the $k^{th}$ zero padded data stream is $D^k(n)$, where n=0, 1, 2, . . . , $N_k-1$, and an $n^{th}$ element in the $k^{th}$ first frequency-domain data stream obtained through the phase rotation is $D_{rot}{}^k(n)$, where n=0, 1, 2, . . . , $N_k-1$, a phase rotation process may be described as: $D_{rot}{}^k(n) = D^k(n) e^{j\theta_k n}$.

Optionally, when all the positions of the data of the K first modulated data streams in the corresponding zero padded data streams are consecutively arranged, if the lengths of the K first frequency-domain data streams are consistent and the lengths of the K first modulated data streams are consistent, or if the lengths of the K first modulated data streams are inconsistent and the lengths of the K first frequency-domain data streams are inconsistent, the phase factor is $$e^{\frac{-j2\pi kn}{K}}, e^{\frac{j2\pi kn}{K}}, e^{\frac{-j2\pi(K-k)n}{K}}, \text{ or } e^{\frac{j2\pi(K-k)n}{K}}.$$

Optionally, when all the positions of the data of the K first modulated data streams in the corresponding zero padded data streams are consecutively arranged, if the lengths of the K first frequency-domain data streams are consistent and the lengths of the K first modulated data streams are inconsistent, the phase factor is $$e^{\frac{-j2\pi nM_{sum}}{N}}, e^{\frac{j2\pi nM_{sum}}{N}}, e^{\frac{-j2\pi n(N-M_{sum})}{N}}, \text{ or } e^{\frac{j2\pi n(N-M_{sum})}{N}}.$$

The $k^{th}$ first modulated data stream $M_{sum}^k$ is a sum of lengths of the first k−1 first modulated data streams, that is, $M_{sum}^k = \Sigma_{l=0}^{k-1} M_l$. Specifically, for a $0^{th}$ first modulated data stream, $M_{sum}^k = 0$.

Optionally, when all the positions of the data of the K first modulated data streams in the corresponding zero padded data streams are arranged in a comb form, the phase factor is $$e^{\frac{-j2\pi kn}{N_k}}, e^{\frac{j2\pi nk}{N_k}}, e^{\frac{-j2\pi n(N_k-k)}{N_k}}, \text{ or } e^{\frac{j2\pi n(N_k-k)}{N_k}}.$$

The foregoing preprocessing (including the zero padding operation, the Fourier transform, and the phase rotation) process may be implemented by using an expression. By using an example in which lengths of the K first frequency-domain data streams are consistent, the lengths of the K first modulated data streams are consistent, the positions of the data of the $k^{th}$ first modulated data stream in the $k^{th}$ zero padded data stream are consecutively arranged, and the starting positions are the same, that is, $S_{padzero}$, one expression manner is:

$$D^k(i) = \frac{1}{\sqrt{N_k}} \sum_{m=0}^{M_k-1} d^k(m) e^{-j\frac{2\pi i(m+S_{padzero})}{N_k}} e^{j\theta_k i}.$$

1202. The transmit end maps the K first frequency-domain data streams to frequency-domain resources, to generate a time-domain symbol.

During specific implementation of step 1202, resource mapping may be performed on the K first frequency-domain data streams, and then inverse Fourier transform is performed on the K first frequency-domain data streams, to obtain the time-domain symbol.

For specific implementation of step 1202, refer to the foregoing step 402. Details are not described herein again.

Figure 13:
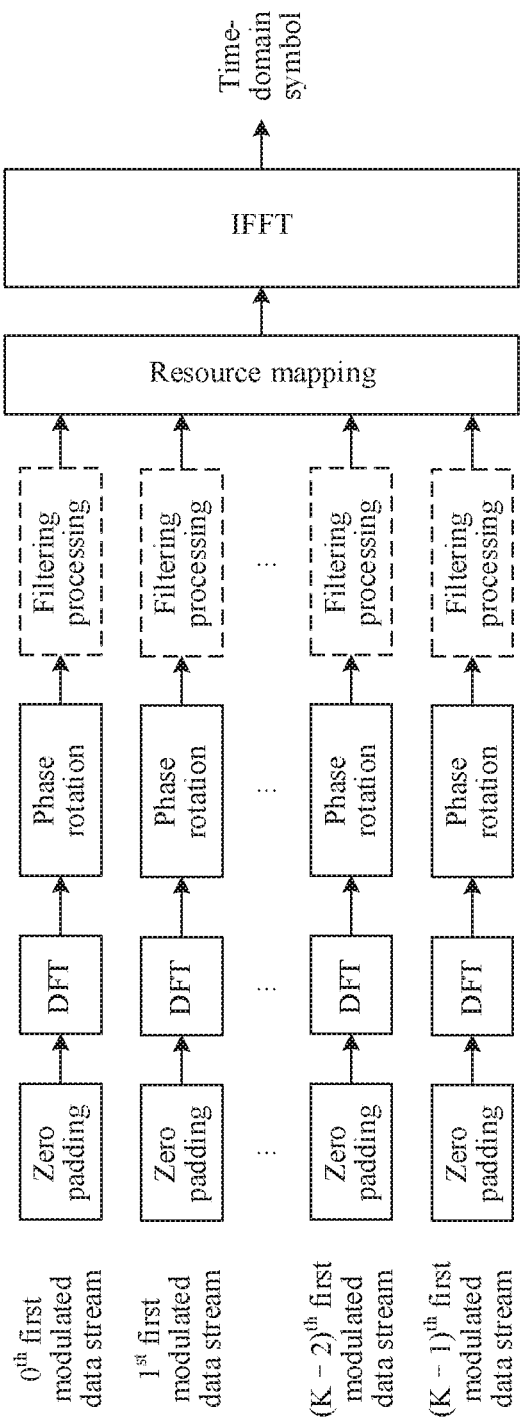
FIG. 13 is a flowchart of a data sending method according to an embodiment of this application.

During specific implementation of step 1202, for a possible implementation, refer to FIG. 13. The transmit end may perform the resource mapping on the K first frequency-domain data, streams, to obtain K third frequency-domain data streams, where a frequency-domain signal includes the K third frequency-domain data streams, and perform the inverse Fourier transform on the frequency-domain signal, to obtain the time-domain symbol.

Figure 14:
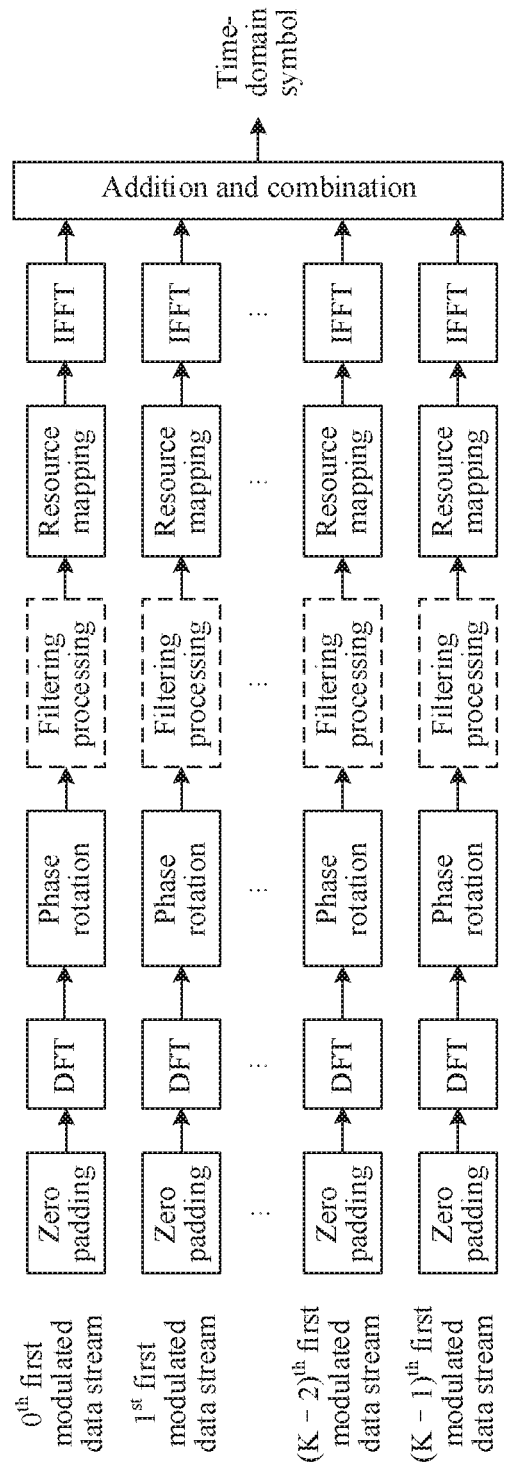
FIG. 14 is a flowchart of another data sending method according to an embodiment of this application.

For another possible implementation, refer to FIG. 14. The transmit end may perform the resource mapping on the K first frequency-domain data streams, to obtain K third frequency-domain data streams, separately perform the inverse Fourier transform on each third frequency-domain data stream, to obtain time-domain data corresponding to each third frequency-domain data stream, and then perform addition and combination on the time-domain data corresponding to the K third frequency-domain data streams, to obtain the time-domain symbol. The two implementations are equivalent. To be specific, the time-domain symbols determined in the two manners are the same. The implementation shown in FIG. 13 is less complex than the implementation shown in FIG. 14.

1203. The transmit end sends the time-domain symbol.

Optionally, when average power on each subcarrier is normalized, the transmit end needs to perform power adjustment by multiplying each data stream by a corresponding constant factor $\tilde{W}_k$, where $\tilde{W}_k = \text{sqrt}(N_k/M_k)$.

Optionally, the K first modulated data streams may be obtained by using a second modulated data stream. Specifically, the $k^{th}$ first modulated data stream is a part of the second modulated data stream, that is, the second modulated data stream includes the K first modulated data streams.

1204. The receive end receives the time-domain symbol.

The receive end may be a communications apparatus. For example, when the transmit end is a terminal, the receive end may be a base station, or when the transmit end is a base station, the receive end may be a terminal.

The time-domain symbol may be the time-domain symbol sent by the transmit end.

1205. The receive end converts the time-domain symbol into the frequency-domain signal, and then performs resource demapping on the frequency-domain signal, to obtain the K first frequency-domain data streams.

Figure 15:
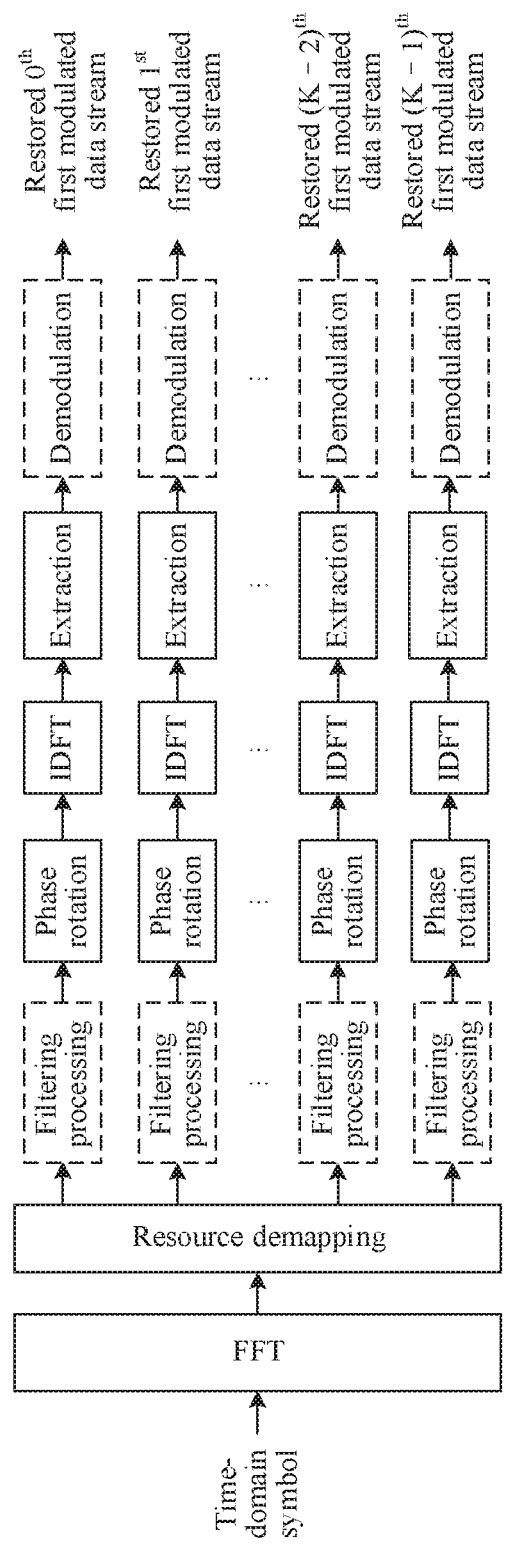
FIG. 15 is a flowchart of a data receiving method according to an embodiment of this application.

During specific implementation of step 1205, referring to FIG. 15, the Fourier transform may be performed on the time-domain symbol, to obtain the frequency-domain signal.

1206. The receive end determines the K first modulated data streams based on the K first frequency-domain data streams, where the $k^{th}$ first modulated data stream is obtained by performing equalization and restoration processing on the received $k^{th}$ first frequency-domain data stream, and the restoration processing includes the phase rotation, the inverse Fourier transform, and the extraction operation.

The equalization operation may be performing equalization on the received K first frequency-domain data streams by using a channel estimation result and a noise estimation result of reference signals corresponding to the received K first frequency-domain data streams, to obtain the restored K first frequency-domain data streams.

The phase rotation may include multiplying each element in the data stream by a phase $\bar{\varphi}_k$, where the phases by which the elements are multiplied may be the same or different, and the phase $\bar{\varphi}_k$ by which each element is multiplied meets: $\bar{\varphi}_k \varphi_k = 1$. Specifically, each element of each restored first frequency-domain data stream is multiplied by the phase $\bar{\varphi}_k$. When a phase factor used for phase rotation corresponding to the $k^{th}$ first frequency-domain data stream at the transmit end includes $\varphi_k = e^{j\Theta_k n}$, optionally, a phase factor used for phase rotation corresponding to the $k^{th}$ first frequency-domain data stream at the receive end includes $e^{-j\Theta_k n}$.

Optionally, when the positions of the data of the $k^{th}$ first modulated data stream in the to-be-extracted data stream are consecutive, if $e^{j\Theta_k n}$ is $$e^{\frac{-j2\pi kn}{K}},$$

$e^{-j\Theta_k n}$ is $$e^{\frac{j2\pi kn}{K}};$$

if $e^{j\Theta_k n}$ is $$e^{\frac{j2\pi kn}{K}},$$

$e^{-j\Theta_k n}$ is $$e^{\frac{-j2\pi kn}{K}};$$

if $e^{j\Theta_k n}$ is $$e^{\frac{-j2\pi(K-k)n}{K}},$$

$e^{-j\Theta_k n}$ is $$e^{\frac{j2\pi(K-k)n}{K}};$$

or if $e^{j\Theta_k n}$ is $$e^{\frac{j2\pi(K-k)n}{K}},$$

$e^{-j\Theta_k n}$ is $$e^{\frac{-j2\pi(K-k)n}{K}}.$$

Optionally, when the positions of the data of the $k^{th}$ first modulated data stream in the to-be-extracted data stream are arranged in a comb form, if $e^{j\Theta_k n}$ is $$e^{\frac{-j2\pi kn}{N_k}},$$

$e^{-j\Theta_k n}$ is $$e^{\frac{j2\pi nk}{N_k}};$$

if $e^{j\Theta_k n}$ is $$e^{\frac{j2\pi nk}{N_k}},$$

$e^{-j\Theta_k n}$ is $$e^{\frac{-j2\pi kn}{N_k}};$$

if $e^{j\Theta_k n}$ is $$e^{\frac{-j2\pi n(N_k-k)}{N_k}},$$

$e^{-j\Theta_k n}$ is $$e^{\frac{j2\pi n(N_k-k)}{N_k}};$$

or if $e^{j\Theta_k n}$ is $$e^{\frac{j2\pi n(N_k-k)}{N_k}},$$

$e^{-j\Theta_k n}$ is $$e^{\frac{-j2\pi n(N_k-k)}{N_k}}.$$

The inverse Fourier transform may include performing the inverse Fourier transform on a data stream obtained by performing the phase rotation on the restored $k^{th}$ first frequency-domain data stream, to obtain the restored $k^{th}$ zero padded data stream, where a size of the inverse Fourier transform is $N_k$.

The extraction operation may specifically include extracting an element at a specific position in the data stream obtained through the inverse Fourier transform, to obtain the first modulated data stream. The specific position is a position of the data of the first modulated data stream in the corresponding zero padded data stream. Specifically, the restored $k^{th}$ zero padded data stream is extracted based on the position of the first modulated data stream in the zero padded data stream, to obtain the restored $k^{th}$ first modulated data stream.

Optionally, starting positions and/or end positions of data of the K first modulated data streams in corresponding to-be-extracted data streams are the same.

According to the method provided in this embodiment of this application, the zero padding operation, the Fourier transform and the phase rotation are performed on the first modulated data stream, to obtain the first frequency-domain data stream; and the resource mapping is performed on the first frequency-domain data stream, and then the first frequency-domain data stream is converted into the time-domain symbol through the inverse Fourier transform. Because the positions of the data of different first modulated data streams in the K first modulated data streams in the corresponding zero padded data streams are overlapped, there is a relatively high probability that peaks of time-domain symbols of different data streams obtained through the inverse Fourier transform after the resource mapping is performed on different first frequency-domain data streams are overlapped, that is, there is a relatively high probability that peaks are superposed in a same direction. By performing different phase rotation on frequency-domain data of different data streams, different cyclic shift may be performed on the time-domain symbols of different data streams, so that the peaks of the time-domain symbols of different data streams are shifted to different positions, thereby greatly reducing the probability of peak overlapping. Therefore, a PAPR of the time-domain symbols converted from the K first frequency-domain data streams is decreased, so that the PAPR is close to a PAPR of single-carrier data.

In addition, frequency-domain resources to which different first frequency-domain data streams are mapped are not overlapped. Therefore, a receiver can obtain a frequency domain diversity gain when demodulating the data, thereby improving demodulation performance.

On the other hand, according to the method provided in this embodiment of this application, an existing single-carrier sending process is slightly changed, and an existing hardware device is slightly affected, so that implementation costs of a hardware device can be reduced.

When a transmit end needs to send data of a plurality of services at the same time, because different services have different lengths of data and each data stream carries data of one service in the foregoing manner, lengths of the K first modulated data streams are inconsistent, and lengths of the K first frequency-domain data streams are inconsistent, thereby meeting a requirement that different services have different lengths of data, and maintaining low PAPR performance while sending the data of the plurality of services.

In the zero padding operation corresponding to the $k^{th}$ first frequency-domain data stream, when the positions of the data of the $k^{th}$ first modulated data stream in the $k^{th}$ zero padded data stream are consecutive, a CM of the time-domain symbols converted from the K first frequency-domain data streams is close to a CM of single-carrier data. Especially when the Pi/2-BPSK modulation is used, single-carrier data in NR may be filtered by a filter, to further reduce the PAPR and the CM, thereby improving coverage performance. In this case, the preprocessing may further include a filtering operation, so that the PAPR and the CM of the time-domain symbols converted from the K first frequency-domain data streams corresponding to the Pi/2-BPSK modulation are close to the PAPR and the CM of the single-carrier data in the NR that is filtered by the filter in the Pi/2-BPSK modulation, thereby obtaining a frequency domain diversity gain while ensuring coverage performance. This improves demodulation performance.

When all the first modulated data streams have same data, the K frequency-domain data streams obtained by performing the zero padding operation and the Fourier transform on the K first modulated data streams are the same. In this case, during specific implementation, the zero padding operation and the Fourier transform need to be performed only once, thereby reducing calculation complexity.

Optionally, in the method provided in this embodiment of this application, referring to FIG. 13 or FIG. 14, the preprocessing at the transmit end further includes filtering processing performed after the Fourier transform is performed. In this case, when the transmit end filters the data and the reference signal corresponding to the data by using a same filter, the receive end may not perform matched filtering. Certainly, referring to FIG. 15, the restoration processing may alternatively include filtering processing performed before the inverse Fourier transform is performed. The filtering processing herein may be filtering processing that matches the filtering processing at the transmit end. The filtering processing may be frequency-domain filtering processing. The PAPR can be better decreased through the filtering processing.

Specifically, the performing, by the transmit end and the receive end, the filtering processing on the data stream may be specifically performing a dot-product operation on the data stream and a first filter. For example, the performing, by the transmit end and the receive end, the filtering processing on the data stream may be specifically performing a dot-product operation on the data stream and an RRC filter of which a length is $N_k$ or an SRRC filter of which a length is $N_k$. A roll-off factor (roll-off factor) of the filter may be predefined, or may be indicated by using the signaling.

It should be noted that, in another possible implementation, when performing the filtering processing, the transmit end may perform time-domain filtering processing instead of the frequency-domain filtering processing. In this case, before step 1203, the foregoing method may further include performing, by the transmit end, time-domain filtering on the time-domain symbol. In this case, during specific implementation, step 1203 may include sending, by the transmit end on a symbol, the time-domain symbol obtained through the time-domain filtering. In this case, the receive end may not perform the matched filtering, or may perform the time-domain filtering after receiving the time-domain data.

FIG. 13 and FIG. 14 show a possible procedure in which the transmit end sends the data, and FIG. 15 shows a possible procedure in which the receive end receives the data.

It should be noted that the first modulated data stream may alternatively be a reference signal sequence. In this embodiment of this application, when the data stream is a sequence including reference signals, the element in the data stream may be a reference signal.

When the element in the first modulated data stream is the reference signal, the receive end may obtain the received K first frequency-domain data streams through the resource demapping, and then generate the K first frequency-domain data streams in a same way as the transmit end generates the K first frequency-domain data streams. The receive end performs operations such as channel estimation and noise estimation by using the K first frequency-domain data streams obtained through the resource demapping and the generated K first frequency-domain data streams, and performs, based on a channel estimation result and a noise estimation result, equalization decoding on the data sent by the transmit end.

Figure 16:
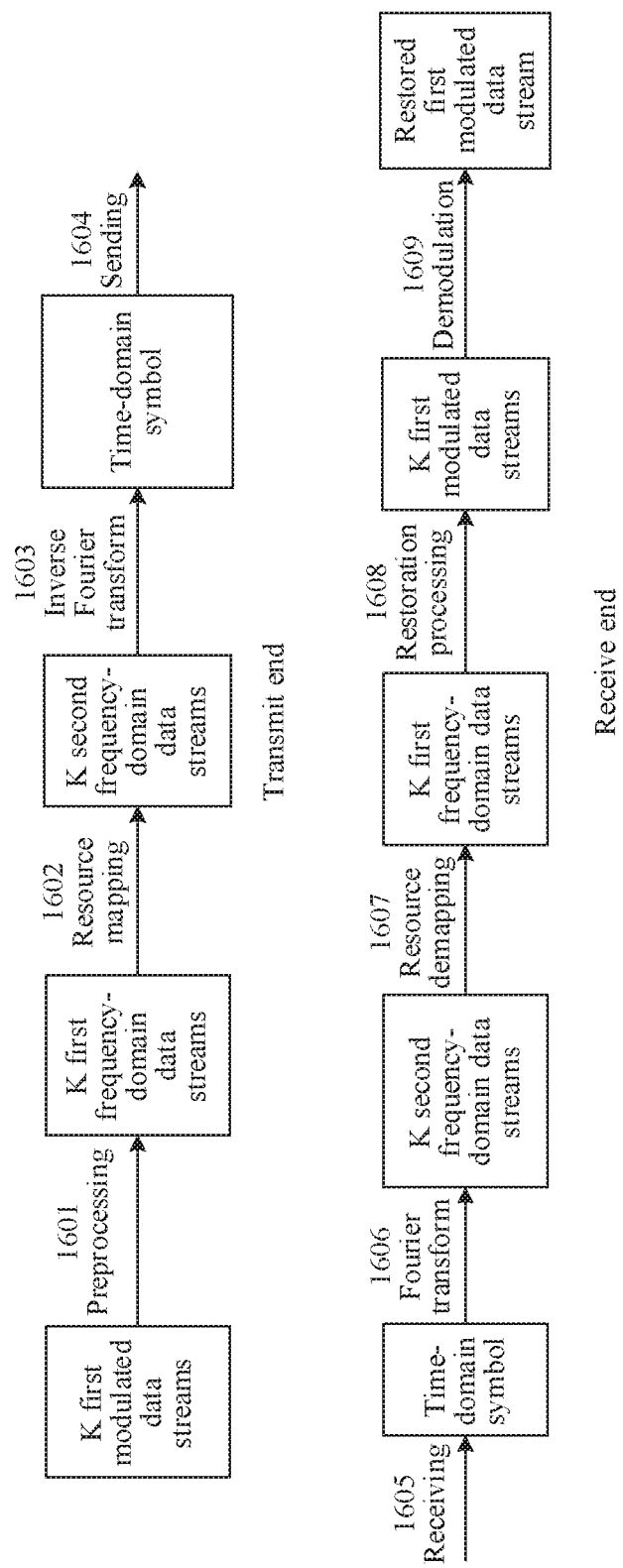
FIG. 16 is a flowchart of a data sending and receiving method according to an embodiment of this application.

For ease of understanding the foregoing method, the foregoing method is further described by using Embodiment 1. In Embodiment 1, an element included in a first modulated data stream is data. Referring to FIG. 16, Embodiment 1 includes the following steps.

1601. A transmit end separately performs preprocessing on K first modulated data streams, to obtain K first frequency-domain data streams.

1602. The transmit end performs resource mapping on the K first frequency-domain data streams, to obtain K third frequency-domain data streams.

1603. The transmit end performs inverse Fourier transform on the K third frequency-domain data streams, to obtain a time-domain symbol.

1604. The transmit end sends the time-domain symbol.

1605. A receive end receives the time-domain symbol sent by the transmit end.

1606. The receive end performs Fourier transform on the time-domain symbol, to obtain the K third frequency-domain data streams.

1607. The receive end performs resource demapping on the K third frequency-domain data streams, to obtain the K first frequency-domain data streams.

Specifically, the receive end may perform the resource demapping by using frequency-domain resource positions to which the K first frequency-domain data streams are mapped, to obtain the K first frequency-domain data streams. The K first frequency-domain data streams may be data streams that have undergone channel estimation and equalization.

1608. The receive end performs restoration processing on the K first frequency-domain data streams, to obtain the K first modulated data streams.

1609. The receive end demodulates the K first modulated data streams, to obtain the restored first modulated data stream.

The preprocessing and the restoration processing may be implemented in the following manners.

Manner 1. The preprocessing includes Fourier transform, cyclic extension, and phase rotation that are performed sequentially. In this case, the restoration processing includes phase rotation, combination, inverse Fourier transform that are performed sequentially.

Manner 2. The preprocessing includes Fourier transform, cyclic extension, phase rotation, and frequency-domain filtering that are performed sequentially.

In a case, the restoration processing may include frequency-domain filtering, phase rotation, combination, and inverse Fourier transform that are performed sequentially.

In another case, when the transmit end filters data and a reference signal corresponding to the data by using a same filter, the restoration processing may include phase rotation, combination, and inverse Fourier transform that are performed sequentially.

Manner 3. The preprocessing includes Fourier transform, cyclic extension, frequency-domain filtering, and phase rotation that are performed sequentially.

In a case, the restoration processing includes phase rotation, frequency-domain filtering, combination, and inverse Fourier transform that are performed sequentially.

In another case, when the transmit end filters data and a reference signal corresponding to the data by using a same filter, the restoration processing may include phase rotation, combination, and inverse Fourier transform that are performed sequentially.

For a related implementation process of any one of Manner 1 to Manner 3 and the solution included in the steps in FIG. 16, refer to the foregoing embodiment based on FIG. 4.

Manner 4. The preprocessing includes a zero padding operation and Fourier transform that are performed sequentially. In this case, the restoration processing includes inverse Fourier transform and an extraction operation that are performed sequentially.

Manner 5. The preprocessing includes a zero padding operation, Fourier transform, and frequency-domain filtering that are performed sequentially. In a case, the restoration processing includes frequency-domain filtering, inverse Fourier transform, and an extraction operation that are performed sequentially. In another case, when the transmit end filters data and a reference signal corresponding to the data by using a same filter, the restoration processing may include inverse Fourier transform and an extraction operation that are performed sequentially.

For a related implementation process of either one of Manner 4 and Manner 5 and the solution included in the steps in FIG. 16, refer to the foregoing embodiment based on FIG. 8.

Manner 6. The preprocessing includes a zero padding operation, Fourier transform, and phase rotation that are performed sequentially. In this case, the restoration processing includes phase rotation, inverse Fourier transform, and an extraction operation that are performed sequentially.

Manner 7. The preprocessing includes a zero padding operation, Fourier transform, phase rotation, and frequency-domain filtering that are performed sequentially. In a case, the restoration processing includes frequency-domain filtering, phase rotation, inverse Fourier transform, and an extraction operation that are performed sequentially. In another case, when the transmit end filters data and a reference signal corresponding to the data by using a same filter, the restoration processing may include phase rotation, inverse Fourier transform, and an extraction operation that are performed sequentially.

For a related implementation process of either one of Manner 6 and Manner 7 and the solution included in the steps in FIG. 16, refer to the foregoing embodiment based on FIG. 12.

In the methods provided in all the foregoing embodiments, when all the K first modulated data streams are the same, for an embodiment in which the preprocessing includes at least the Fourier transform, the cyclic extension, and the phase rotation, the following Operation 1 or Operation 2 may be added to the preprocessing.

Operation 1. A phase rotation operation is added to the preprocessing at the transmit end, and the phase rotation operation is performed before the Fourier transform is performed, that is, the Fourier transform is performed after the phase rotation is performed on each first modulated data stream. Specifically, each element in the first modulated data stream is multiplied by a phase $\delta_k$, where the phases by which the elements are multiplied may be the same or different. Correspondingly, the receive end may perform the phase rotation and demodulation and restoration on the K first modulated data streams, to obtain target data. The multiplied phase factor is $\tilde{\delta}_k$, and meets: $\delta_k \tilde{\delta}_k = 1$.

$\delta_k$ may be indicated by using signaling, for example, may be notified by using at least one of the signaling such as DCI, RRC, a MAC CE, and UCI, or may be determined in an implicit manner. A phase factor used for phase rotation corresponding to an $n^{th}$ element in the $k^{th}$ first modulated data stream may be $\delta_k = e^{j\rho_k n}$. For example, a phase factor by which an element in the $k^{th}$ first modulated data stream is multiplied may be implicitly determined as $$e^{\frac{-j2\pi k n}{K}}, e^{\frac{j2\pi k n}{K}}, e^{\frac{-j2\pi(K-k)n}{K}}, \text{ or } e^{\frac{j2\pi(K-k)n}{K}}.$$

Operation 2. A cyclic shift operation is added to the preprocessing at the transmit end, and the cyclic shift is performed after the Fourier transform is performed. Specifically, the cyclic shift may be performed immediately after the Fourier transform is performed, or immediately after the cyclic extension is performed, or immediately after the phase rotation is performed. If an amount of data cyclically shifted by the transmit end is $X_k$, the receive end cyclically shifts by $-X_k$ bits from a corresponding position. $X_k$ may be indicated by using signaling or predefined.

In another possible implementation, an offset $\Delta X_k$ is added to the cyclic shift operation in the preprocessing at the transmit end. For example, if a data stream $A_k$ of which a length is $M_k$ is $a_0, a_1, \ldots a_{M_k-1}$, a data stream $B_k$ that is obtained through the cyclic extension and of which a length is $N_k$ may be $b_0, b_1, \ldots, b_{N_k-1}$. When an $m^{th}$ element in the data stream $A_k$ is denoted as $A_k(m)$, and an $n^{th}$ element in the data stream $B_k$ is denoted as $B_k(n)$, $B_k(n)=A_k((n+\Delta X_k) \bmod M_k)$.

When all the K first modulated data streams are the same and positions of data of the first modulated data stream in a zero padded data stream are arranged in a comb form, for an embodiment in which the preprocessing includes at least the zero padding; operation, the Fourier transform, and the phase rotation, or an embodiment in which the preprocessing includes at least the zero padding operation and the Fourier transform, the following Operation 3 or Operation 4 may be added to the preprocessing.

Operation 3. A phase rotation operation is added to the preprocessing at the transmit end, and the phase rotation operation is performed before the Fourier transform is performed, that is, the zero padding operation is performed after the phase rotation is performed on each first modulated data stream, or the Fourier transform may be performed after the phase rotation is performed on each zero padded data stream. By using an example in which the zero padding operation is performed after the phase rotation is performed on each first modulated data stream, each element in the first modulated data stream is multiplied by a phase $\delta_k$, where the phases by which the elements are multiplied may be the same or different. Correspondingly, the receive end may perform the phase rotation and demodulation and restoration on the K first modulated data streams, to obtain target data. The multiplied phase factor is $\tilde{\delta}_k$, and meets: $\delta_k \tilde{\delta}_k = 1$.

$\delta_k$ may be indicated by using signaling, for example, may be notified by using at least one of the signaling such as DCI, RRC, a MAC CE, and UCI, or may be determined in an implicit manner. A phase factor used for phase rotation corresponding to an $n^{th}$ element in the $k^{th}$ first modulated data stream may be $\delta_k = e^{j p_k n}$. For example, a phase factor by which an element in the $k^{th}$ first modulated data stream is multiplied may be implicitly determined as $$e^{\frac{-j2\pi k n}{K}}, e^{\frac{j2\pi k n}{K}}, e^{\frac{-j2\pi(K-k)n}{K}}, \text{ or } e^{\frac{j2\pi(K-k)n}{K}}.$$

Operation 4. A cyclic shift operation is added to the preprocessing at the transmit end, and the cyclic shift is performed after the Fourier transform is performed. Specifically, the cyclic shift may be performed immediately after the Fourier transform is performed, or immediately after the phase rotation is performed. If an amount of data cyclically shifted by the transmit end is $X_k$, the receive end cyclically shifts by $-X_k$ bits from a corresponding position. $X_k$ may be indicated by using signaling or predefined.

It should be noted that, when all the K first modulated data streams are the same, an example in which the zero padding operation is comb zero padding is used, and although there is a relatively low probability that peaks of time-domain symbols of different data streams are overlapped, a time-domain symbol of a data stream may be obtained by performing the cyclic shift on a time-domain symbol of another data stream because data of the K first modulated data streams is the same. Therefore, peak data of the time-domain symbol of the data stream and non-peak data of the time-domain symbol of the another data stream at a same position may be superposed in a same direction, and consequently, a PAPR of the time-domain symbol is increased.

According to the manner described above, the time-domain symbol of the data stream cannot be obtained by performing the cyclic shift on the time-domain symbol of the another data stream, so that a probability that the peak data of the time-domain symbol of the data stream and the non-peak data of the time-domain symbol of the another data stream at the same position are superposed in a same direction is reduced, thereby decreasing the PAPR, so that the PAPR is close to a PAPR of single-carrier data.

In descriptions of the embodiments of this application, numbers of elements in the data stream start from 0. Actually, the numbers may alternatively start from 1 or another number. This is not specifically limited in the embodiments of this application.

In the embodiments of this application, all the data streams obtained by the receive end are the data streams obtained through the restoration by the receive end. It should be noted that the data streams obtained through the restoration may be different from or the same as the data streams determined by the corresponding transmit end.

The solution provided in the embodiments of this application is mainly described above from the perspective of the method. It can be understood that, to implement the foregoing functions, the communications apparatus includes corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method examples. For example, the functional modules may be divided corresponding to the functions, or two or more functions may be integrated into one processing module. The integrated module may be implemented in a form of hardware, or may be implemented in a form of a software functional module. It should be noted that, in the embodiments of this application, module division is exemplary, and is merely a logical function division. In actual implementation, another division manner may be used.

Figure 17:
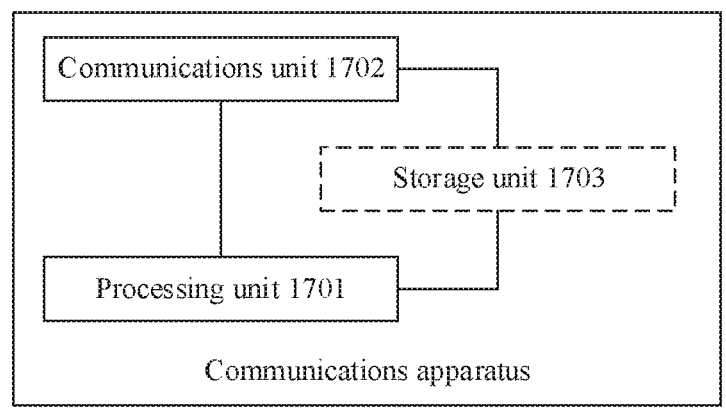
FIG. 17 is a schematic composition diagram of a communications apparatus according to an embodiment of this application.

For example, when an integrated functional module is used, FIG. 17 is a possible schematic structural diagram of a communications apparatus in the foregoing embodiments. The communications apparatus may be the transmit end or the receive end described above. Referring to FIG. 17, the communications apparatus may include a processing unit 1701 and a communications unit 1702, and may further include a storage unit 1703.

When the communications apparatus is a transmit end, the processing unit 1701 is configured to perform control management on an action of the transmit end. For example, the processing unit 1701 is configured to support the transmit end in performing step 401 to step 403 in FIG. 4, step 801 to step 803 in FIG. 8, step 1201 to step 1203 in FIG. 12, actions performed by the transmit end in FIG. 5, FIG. 6, FIG. 9, FIG. 10, FIG. 13, FIG. 14, FIG. 16, and FIG. 17, and/or actions performed by the transmit end in another process described in the embodiments of this application. The communications unit 1702 is configured to support the transmit end in communicating with another communications apparatus, for example, communicating with a receive end in FIG. 4. The storage unit 1703 is configured to store program code and data of the transmit end.

When the communications apparatus is a receive end, the processing unit 1701 is configured to perform control management on an action of the receive end. For example, the processing unit 1701 is configured to support the receive end in performing step 404 to step 406 in FIG. 4, step 804 to step 806 in FIG. 8, step 1204 to step 1206 in FIG. 12, actions performed by the receive end in FIG. 7, FIG. 11, FIG. 16, and FIG. 17, and/or actions performed by the receive end in another process described in the embodiments of this application. The communications unit 1702 is configured to support the receive end in communicating with another communications apparatus, for example, communicating with a transmit end in FIG. 4. The storage unit 1703 is configured to store program code and data of the receive end.

The processing unit 1701 may be a processor or a controller. The communications unit 1702 may be a communications interface, a transceiver, a transceiver circuit, or the like. The communications interface is a general name and may include one or more interfaces. The storage unit 1703 may be a memory. When the processing unit 1701 is the processor, the communications unit 1702 is the communications interface, and the storage unit 1703 is the memory, the communications apparatus in this embodiment of this application may be a communications apparatus shown in FIG. 3.

When the communications apparatus shown in FIG. 3 is a transmit end, a processor 301 is configured to perform control management on an action of the transmit end. For example, the processor 301 is configured to support the transmit end in performing step 401 to step 403 in FIG. 4, step 801 to step 803 in FIG. 8, step 1201 to step 1203 in FIG. 12, actions performed by the transmit end in FIG. 5, FIG. 6, FIG. 9, FIG. 10, FIG. 13, FIG. 14, FIG. 16, and FIG. 17, and/or actions performed by the transmit end in another process described in the embodiments of this application. A communications interface 304 is configured to support the transmit end in communicating with another communications apparatus, for example, communicating with a receive end in FIG. 4. The memory 303 is configured to store program code and data of the transmit end.

When the communications apparatus shown in FIG. 3 is a receive end, the processor 301 is configured to perform control management on an action of the receive end. For example, the processor 301 is configured to support the receive end in performing step 404 to step 406 in FIG. 4, step 804 to step 806 in FIG. 8, step 1204 to step 1206 in FIG. 12, actions performed by the receive end in FIG. 7, FIG. 11, FIG. 16, and FIG. 17, and/or actions performed by the receive end in another process described in the embodiments of this application. The communications interface 304 is configured to support the receive end in communicating with another communications apparatus, for example, communicating with a transmit end in FIG. 4. The memory 303 is configured to store program code and data of the receive end.

An embodiment of this application further provides a computer-readable storage medium. The computer-readable storage medium includes an instruction, and when the instruction is run on a computer, the computer is enabled to perform the foregoing method.

An embodiment of this application further provides a computer program product including an instruction. When the computer program product is run on a computer, the computer is enabled to perform the foregoing method.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD for short)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data sending apparatus, comprising a processor and a transceiver, wherein
    the processor is configured to generate K first frequency-domain data streams, wherein a $k^{th}$ first frequency-domain data stream of the K first frequency-domain data streams is determined by performing preprocessing on a $k^{th}$ first modulated data stream, and the preprocessing comprises at least a Fourier transform, a cyclic extension, or a phase rotation;

a length of the $k^{th}$ first frequency-domain data stream of the K first frequency-domain data streams is $N_k$, and a length of the $k^{th}$ first modulated data stream is $M_k$; where K is a positive integer greater than 1; where an integer k=0, 1, . . . , K−1; and where $N_k$ and $M_k$ are positive integers;

the processor is further configured to map the K first frequency-domain data streams to frequency-domain resources to generate a time-domain symbol; and the transceiver is configured to send the time-domain symbol.

2. The apparatus according to claim 1, wherein the length $M_k$ of the $k^{th}$ first modulated data stream is determined by the positive integer $N_k$ and the positive integer K.

3. The apparatus according to claim 2, wherein the length $M_k = N_k/K$.

4. The apparatus according to claim 1, wherein a phase factor is useable as the phase rotation that corresponds to the $k^{th}$ first frequency-domain data stream of the K first frequency-domain data streams, wherein the phase factor comprises $e^{j\alpha_k n}$, wherein n=0, 1, . . . , $N_k$−1, and $\alpha_k$ is a phase parameter related to the integer k.

5. The apparatus according to claim 4, wherein the $e^{j\alpha_k n}$ is $$e^{\frac{-j2\pi kn}{N_k}}, e^{\frac{j2\pi nk}{N_k}}, e^{\frac{-j2\pi n(N_k-k)}{N_k}}, \text{ or } e^{\frac{j2\pi n(N_k-k)n}{N_k}}.$$

6. The apparatus according to claim 1, wherein at least two of K first modulated data streams are included as two corresponding parts of a second modulated data stream.

7. A data sending apparatus, comprising a processor and a transceiver, wherein the processor is configured to generate K first frequency-domain data streams, wherein a $k^{th}$ first frequency-domain data stream of the K first frequency-domain data streams is determined by performing preprocessing on a $k^{th}$ first modulated data stream, and the preprocessing comprises at least a zero padding operation or a Fourier transform;

a length of the $k^{th}$ first frequency-domain data stream of the K first frequency-domain data streams is $N_k$, and a length of the $k^{th}$ first modulated data stream is $M_k$; where K is a positive integer greater than 1; where an integer k=0, 1, . . . , K−1; and where $N_k$ and $M_k$ are positive integers;

the processor is further configured to map the K first frequency-domain data streams to frequency-domain resources to generate a time-domain symbol; and the transceiver is configured to send the time-domain symbol.

8. The apparatus according to claim 7, wherein positions of data of the $k^{th}$ first modulated data stream in a data stream determined through the zero padding operation are consecutively arranged; or positions of data of the $k^{th}$ first modulated data stream in a data stream determined through the zero padding operation are arranged in a comb form.

9. The apparatus according to claim 7, wherein the preprocessing further comprises filtering performed after the Fourier transform is performed.

10. The apparatus according to claim 7, wherein at least starting positions or end positions of data of K first modulated data streams in corresponding data streams determined through the zero padding operation are the same, and the preprocessing further comprises phase rotation performed after the Fourier transform is performed.

11. The apparatus according to claim 10, wherein a phase factor is useable as the phase rotation that corresponds to the $k^{th}$ first frequency-domain data stream of the K first frequency-domain data streams, wherein the phase factor comprises $e^{j\theta_k n}$, wherein n=0, 1, . . . , $N_N$−1, and $\theta_k$ is a phase parameter related to the integer k.

12. The apparatus according to claim 11, wherein the positions of the data of the $k^{th}$ first modulated data stream in the data stream determined through the zero padding operation are consecutive, the $e^{j\theta_k n}$ is $$e^{\frac{-j2\pi kn}{K}}, e^{\frac{j2\pi kn}{K}}, e^{\frac{-j2\pi(K-k)n}{K}}, \text{ or } e^{\frac{j2\pi(K-k)n}{K}}.$$

13. The apparatus according to claim 11, wherein the positions of the data of the $k^{th}$ first modulated data stream in the data stream determined through the zero padding operation are arranged in the comb form, the $e^{j\theta_k n}$ is $$e^{\frac{-j2\pi kn}{N_k}}, e^{\frac{j2\pi nk}{N_k}}, e^{\frac{-j2\pi n(N_k-k)}{N_k}}, \text{ or } e^{\frac{j2\pi n(N_k-k)n}{N_k}}.$$

14. The apparatus according to claim 7, wherein the $k^{th}$ first modulated data stream is determined by performing Pi/2-BPSK modulation on to-be-sent data.

15. A non-transitory computer-readable storage medium, comprising instructions, wherein when the instructions are executed by a processor, the processor is configured to perform a method comprising:

generating K first frequency-domain data streams, wherein a $k^{th}$ first frequency-domain data stream of the K first frequency-domain data streams is determined by performing preprocessing on a $k^{th}$ first modulated data stream, and the preprocessing comprises at least a Fourier transform, a cyclic extension, or a phase rotation;

a length of the $k^{th}$ first frequency-domain data stream of the K first frequency-domain data streams is $N_k$, and a length of the $k^{th}$ first modulated data stream is $M_k$; where K is a positive integer greater than 1; where an integer k=0, 1, . . . , K−1; and where $N_k$ and $M_k$ are positive integers;

mapping the K first frequency-domain data streams to frequency-domain resources to generate a time-domain symbol; and sending the time-domain symbol.

16. The non-transitory computer-readable storage medium according to claim 15, wherein the length $M_k$ of the $k^{th}$ first modulated data stream is determined by the positive integer $N_k$ and the positive integer K.

17. The non-transitory computer-readable storage medium according to claim 16, wherein the length $M_k = N_k/K$.

18. The non-transitory computer-readable storage medium according to claim 15, wherein a phase factor is useable as the phase rotation that corresponds to the $k^{th}$ first frequency-domain data stream of the K first frequency-domain data streams, wherein the phase factor comprises $e^{j\alpha_k n}$, wherein n=0, 1, ..., $N_k-1$, and $\alpha_k$ is a phase parameter related to the integer k.

19. The non-transitory computer-readable storage medium according to claim 18, wherein the $e^{j\alpha_k n}$ is $$e^{\frac{-j2\pi k n}{N_k}}, e^{\frac{j2\pi n k}{N_k}}, e^{\frac{-j2\pi n(N_k-k)}{N_k}}, \text{ or } e^{\frac{j2\pi n(N_k-k)}{N_k}}.$$

20. The non-transitory computer-readable storage medium according to claim 15, wherein at least two of K first modulated data streams are included as two corresponding parts of a second modulated data stream.

* * * * *

UNITED STATES PATENT AND TRADEMARK OFFICE
CERTIFICATE OF CORRECTION

PATENT NO. : 11,025,467 B2
APPLICATION NO. : 16/914643
DATED : June 1, 2021
INVENTOR(S) : Yuanzhou Hu et al.

Page 1 of 1

It is certified that error appears in the above-identified patent and that said Letters Patent is hereby corrected as shown below:

In the Claims

Column 41, Lines 33-35 approx. Claim 5, should be replaced with:

5. The apparatus according to claim 4, wherein the $e^{j\alpha_k n}$ is $e^{\frac{-j2\pi kn}{N_k}}$, $e^{\frac{j2\pi nk}{N_k}}$, $e^{\frac{-j2\pi n(N_k-k)}{N_k}}$, or $e^{\frac{j2\pi n(N_k-k)}{N_k}}$.

Column 42, Lines 12-17 Claim 11, should be replaced with:
11. The apparatus according to claim 10, wherein a phase factor is useable as the phase rotation that corresponds to the $k^{th}$ first frequency-domain data stream of the K first frequency-domain data streams, wherein the phase factor comprises $e^{j\theta_k n}$, wherein n=0, 1, ..., $N_k - 1$, and $\theta_k$ is a phase parameter related to the integer $k$.

Column 42, Lines 27-34 Claim 13, should be replaced with:
13. The apparatus according to claim 11, wherein the positions of the data of the $k^{th}$ first modulated data stream in the data stream determined through the zero padding operation are arranged in the comb form, the $e^{j\theta_k n}$ is $e^{\frac{-j2\pi kn}{N_k}}$, $e^{\frac{j2\pi nk}{N_k}}$, $e^{\frac{-j2\pi n(N_k-k)}{N_k}}$, or $e^{\frac{j2\pi n(N_k-k)}{N_k}}$.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*